US012795356B2

(12) United States Patent
Elshafie et al.

(10) Patent No.: US 12,795,356 B2
(45) Date of Patent: Nov. 10, 2026

(54) SECRET KEY VERIFICATION IN WIRELESS COMMUNICATION

(71) Applicant: QUALCOMM Incorporated, San Diego, CA (US)

(72) Inventors: Ahmed Elshafie, San Diego, CA (US); Alexandros Manolakos, Escondido, CA (US); Seyedkianoush Hosseini, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 18/560,004

(22) PCT Filed: Jun. 14, 2022

(86) PCT No.: PCT/US2022/033415
§ 371 (c)(1),
(2) Date: Nov. 9, 2023

(87) PCT Pub. No.: WO2023/287537
PCT Pub. Date: Jan. 19, 2023

(65) Prior Publication Data
US 2024/0259795 A1 Aug. 1, 2024

(30) Foreign Application Priority Data
Jul. 16, 2021 (GR) .............................. 20210100478

(51) Int. Cl.
*H04W 12/041* (2021.01)
*H04W 12/06* (2021.01)

(52) U.S. Cl.
CPC ......... *H04W 12/041* (2021.01); *H04W 12/06* (2013.01)

(58) Field of Classification Search
None
See application file for complete search history.

(56) References Cited

U.S. PATENT DOCUMENTS 7,246,242 B1 * 7/2007 Niemi ................. H04W 12/106 380/255
10,992,338 B1 * 4/2021 Priyantha ............. H04B 17/318
(Continued)

FOREIGN PATENT DOCUMENTS

WO 2006081122 A2 8/2006
WO 2009137621 A1 11/2009

OTHER PUBLICATIONS

International Search Report and Written Opinion—PCT/US2022/033415—ISA/EPO—Sep. 23, 2022.

*Primary Examiner* — Michael Pyzocha
(74) *Attorney, Agent, or Firm* — Procopio, Cory, Hargreaves & Savitch LLP

(57) ABSTRACT

The apparatus may include first and second wireless devices, and the first and second wireless devices may be a UE or a base station. The first wireless device may generate one or more verification bits based on one or more secret keys, and transmit to the second wireless device the indication of the one or more verification bits. The second wireless device may receive the indication of the one or more verification bits, decode the one or more verification bits, and transmit feedback to the first wireless device. The first and second wireless devices may select at least one resource of a plurality of resources for the communication of the one or more verification bits based on at least part in the encoded or modified at least one secret key to communicate the one or more verification bits.

30 Claims, 15 Drawing Sheets

(56) References Cited

U.S. PATENT DOCUMENTS

| | | | | |
|---|---|---|---|---|
| 11,265,722 | B2 * | 3/2022 | Weng | H04W 84/18 |
| 12,408,028 | B2 * | 9/2025 | Bushell | H04L 9/3234 |
| 2009/0028262 | A1 * | 1/2009 | Imai | H04W 12/041<br>375/267 |
| 2012/0106737 | A1 * | 5/2012 | Ly | H04L 9/0875<br>380/270 |
| 2012/0106739 | A1 * | 5/2012 | Ly | H04W 12/0433<br>380/270 |
| 2014/0219449 | A1 * | 8/2014 | Shattil | H04W 12/08<br>380/270 |
| 2017/0064546 | A1 * | 3/2017 | Baligh | H04W 12/041 |
| 2019/0098495 | A1 * | 3/2019 | Tenny | H04W 76/10 |
| 2019/0098497 | A1 * | 3/2019 | Shapira | H04L 9/0875 |
| 2019/0149986 | A1 * | 5/2019 | Luo | H04W 72/23<br>455/410 |
| 2020/0029262 | A1 * | 1/2020 | Kim | H04W 36/0061 |
| 2021/0058907 | A1 | 2/2021 | Fakoorian et al. | |
| 2021/0266326 | A1 * | 8/2021 | Chen | H04L 67/52 |
| 2022/0182832 | A1 * | 6/2022 | Hessler | H04W 12/06 |
| 2022/0201471 | A1 * | 6/2022 | Yunusov | H04B 7/0413 |
| 2022/0386192 | A1 * | 12/2022 | You | H04L 9/0894 |
| 2023/0269589 | A1 * | 8/2023 | Baskaran | H04W 12/037<br>726/6 |
| 2024/0187850 | A1 * | 6/2024 | Elshafie | G06F 21/606 |
| 2024/0244426 | A1 * | 7/2024 | Kunz | H04W 12/041 |

* cited by examiner

SECRET KEY VERIFICATION IN WIRELESS COMMUNICATION

CROSS REFERENCE TO RELATED APPLICATIONS

This application is a National Stage Application filed under 35 U.S.C. § 371 of PCT International Application Serial No. PCT/US2022/033415 entitled "SECRET KEY VERIFICATION IN WIRELESS COMMUNICATION" and filed on Jun. 14, 2022, which claims the benefit of Greek application Ser. No. 20/210,100478, entitled "SECRET KEY VERIFICATION IN WIRELESS COMMUNICATION" and filed on Jul. 16, 2021, which are expressly incorporated by reference herein in their entirety.

TECHNICAL FIELD

The present disclosure relates generally to communication systems, and more particularly, to a method of verifying a secret key associated with wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include first and second wireless devices, and the first and second wireless devices may be a user equipment (UE) or a base station. The first wireless device may generate one or more verification bits based on one or more secret keys, and transmit to the second wireless device the indication of the one or more verification bits. The second wireless device may receive the indication of the one or more verification bits, decode the one or more verification bits, and transmit feedback to the first wireless device. The first and second wireless devices may select at least one resource of a plurality of resources for the communication of the one or more verification bits based on at least part in the encoded or modified at least one secret key to communicate the one or more verification bits.

In one aspect, the first and second wireless devices may obtain the at least one secret key including the one or more secret key bits for the communication with the second wireless device. The at least one secret key may be generated based on channel randomness or obtained from a third wireless device.

In some aspects, the feedback may be an acknowledgement (ACK) or a negative ACK (NACK), received via at least one of sidelink control information (SCI), uplink control information (UCI), or downlink control information (DCI). In one aspect, the feedback may be the NACK, and the first and second wireless devices may re-configure the at least one secret key including the one or more secret key bits based on at least one of the bitmap, the hash function, or the polynomial. In one aspect, the feedback may include an identifier (ID) of the at least one secret key associated with the one or more verification bits, and the feedback may be received via at least one of a radio resource control (RRC) message or a medium access control (MAC) control element (CE) (MAC-CE).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
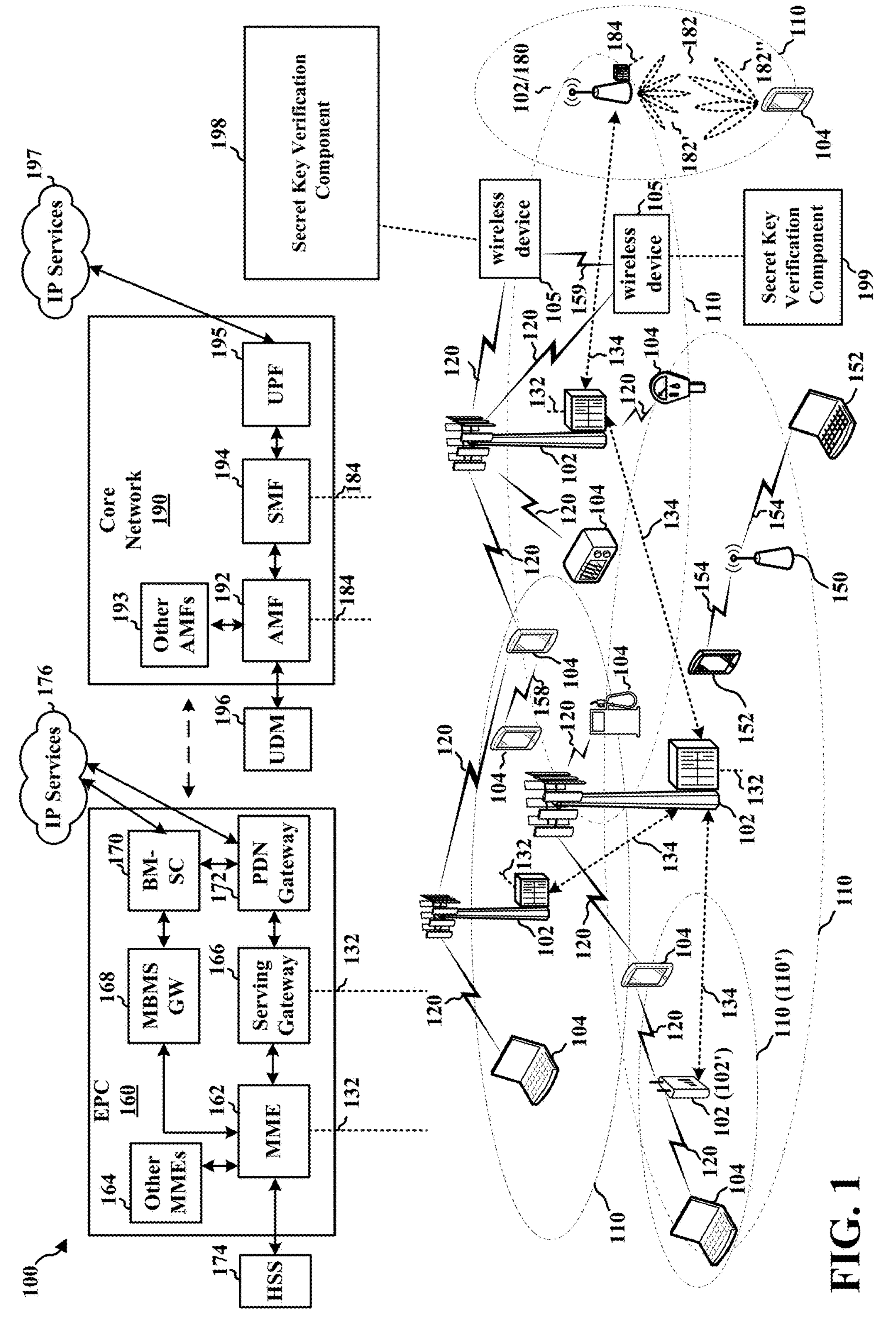
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

The wireless communications system may include at least one wireless device 105. Here, each of the at least one wireless device 105 may be a UE 104 or a base station 102/180. In case the at least one wireless device 105 includes a UE 104 and a base station 102/180, a link 159 between the at least one wireless device 105 may be established as an access link, e.g., using a Uu interface. In case the at least one wireless device 105 includes two UEs 104, other communication 159 may be exchanged between wireless devices based on sidelink. For example, some UEs 104 may communicate with each other directly using a device-to-device (D2D) communication link. In some examples, the D2D communication link may use the DL/UL WWAN spectrum. The D2D communication link 159 may use one or more sidelink channels, such as the PSBCH, the PSDCH, the PSSCH, and the PSCCH. D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 3. Although the following description, including the example slot structure of FIG. 2, may provide examples for sidelink communication in connection with 5G NR, the concepts described herein may be applicable to other similar areas, such as LTE, LTE -A, CDMA, GSM, and other wireless technologies.

Referring again to FIG. 1, in certain aspects, a wireless device 105 may be a first wireless device, including a secret key verification component 198 configured to encode or modify at least one secret key including one or more secret key bits based on at least one of a bitmap, a hash function, or a polynomial, such that the one or more secret key bits correspond to one or more verification bits, the at least one secret key being associated with communication with a second wireless device, transmit, to the second wireless device, an indication of the one or more verification bits, and receive, from the second wireless device, feedback corresponding to the one or more verification bits. In certain aspects, a wireless device 105 may be a second wireless device, including a secret key verification component 199 configured to receive, from a second wireless device via at least one resource, an indication of one or more verification bits, the one or more verification bits corresponding to at least one secret key, the at least one secret key being associated with communication with the first wireless device, decode the one or more verification bits based on at least one of a bitmap, a hash function, or a polynomial, such that the decoded one or more verification bits correspond to one or more secret key bits of the at least one secret key, and transmit, to the first wireless device, feedback corresponding to the decoded one or more verification bits. Although the following description may be focused on 5G NR, the concepts described herein may be applicable to other similar areas, such as LTE, LTE-A, CDMA, GSM, and other wireless technologies.

Figures 2A, 2B, 2C, 2D:
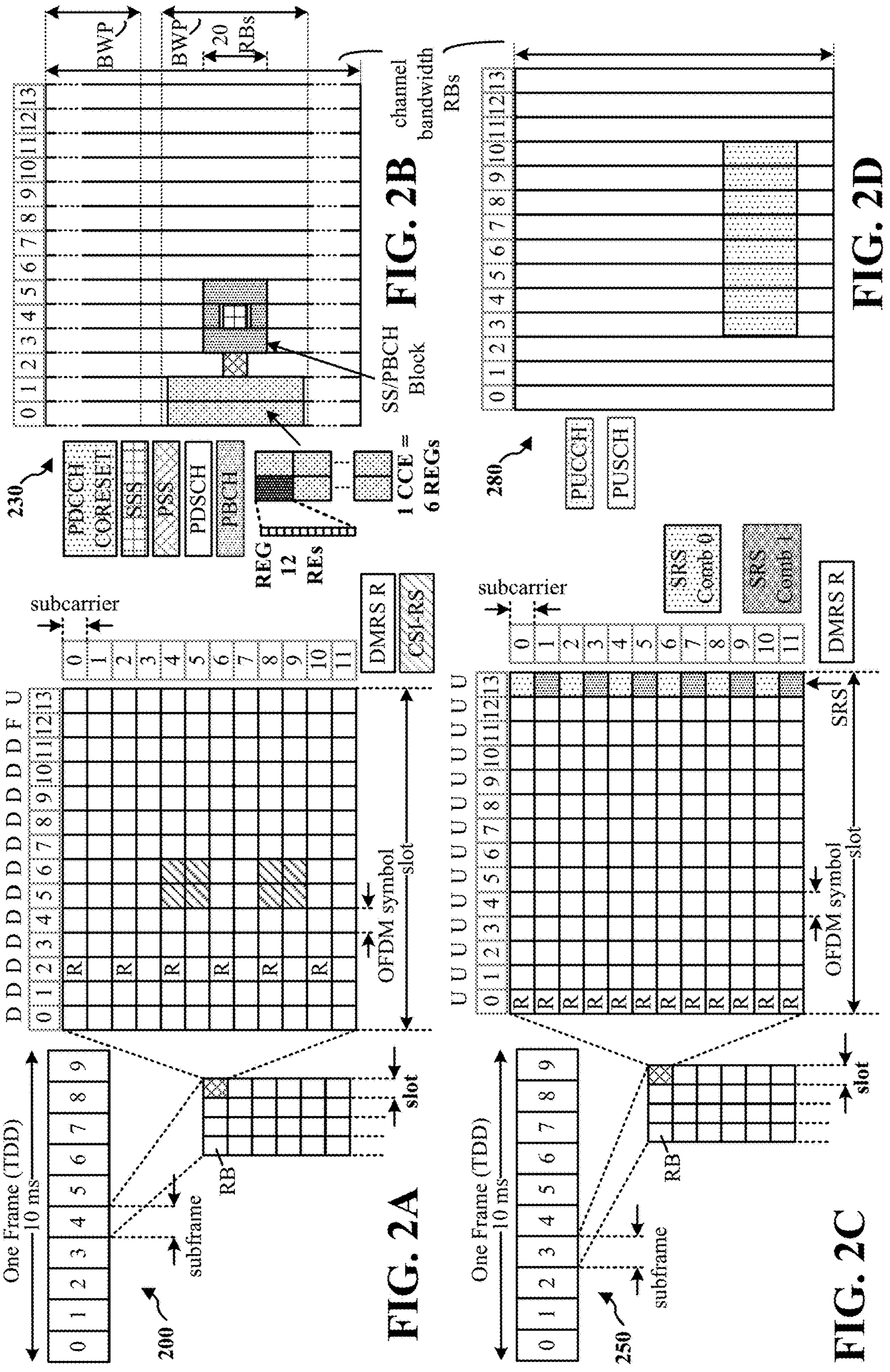
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/ SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
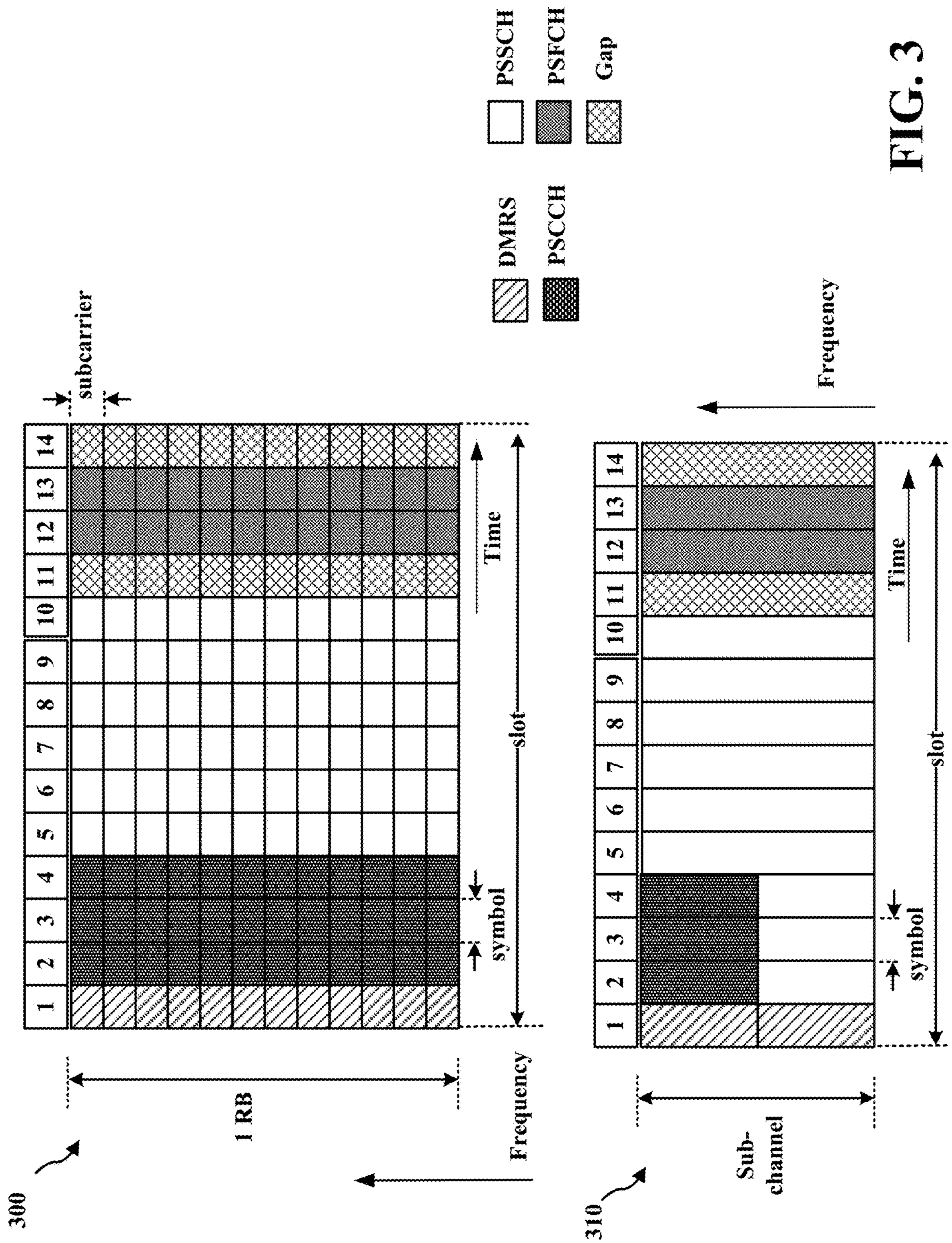
FIG. 3 illustrates example aspects of a sidelink slot structure.

FIG. 3 includes diagrams 300 and 310 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 3 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 2 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 2 symbols. The diagram 310 in FIG. 3 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may include control information in PSCCH and some REs may include demodulation RS (DMRS). At least one symbol may be used for feedback. FIG. 3 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 3. Multiple slots may be aggregated together in some aspects.

Figure 4:
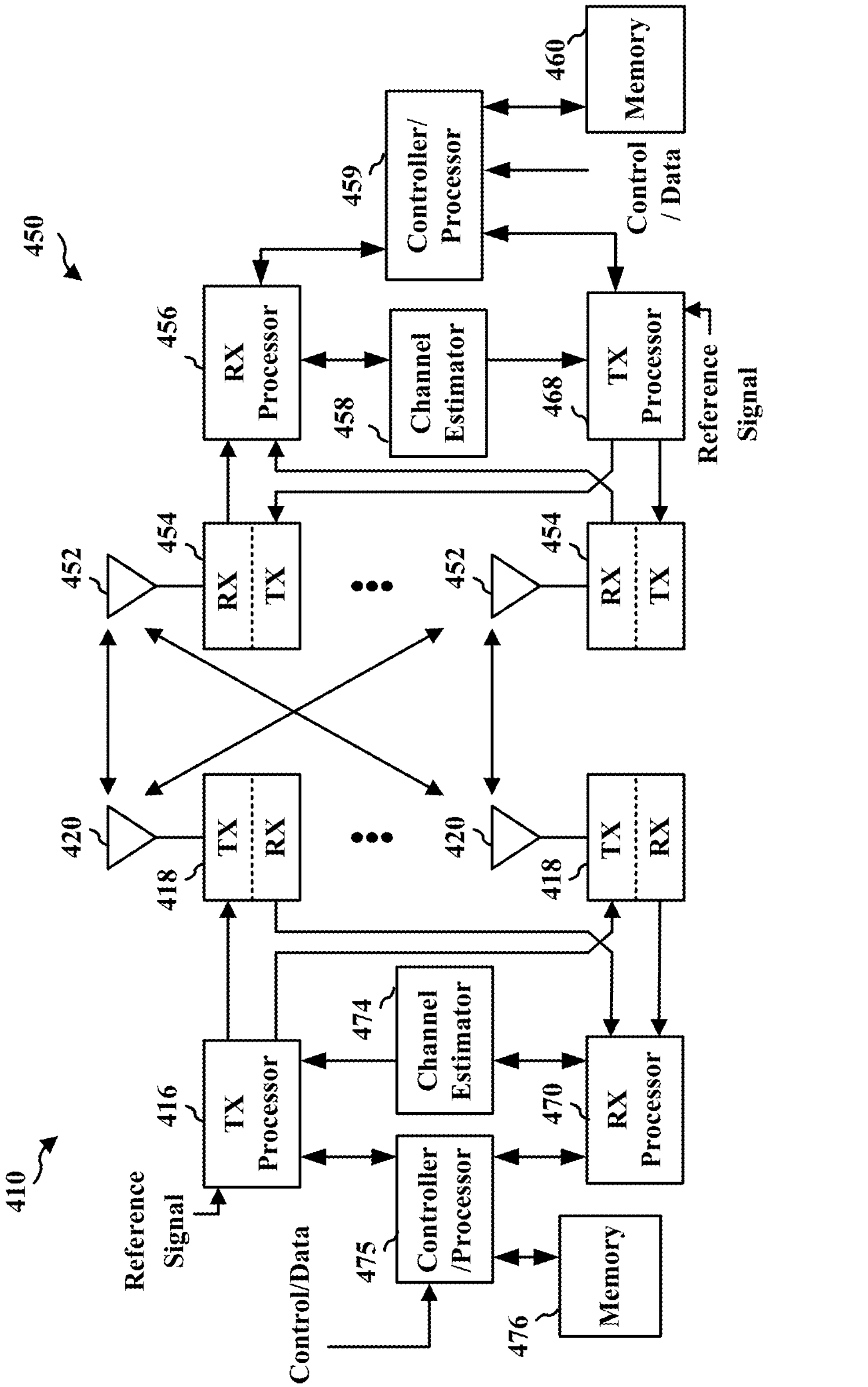
FIG. 4 is a diagram illustrating an example of a base station and user equipment (UE) in an access network.

FIG. 4 is a block diagram of a base station 410 in communication with a UE 450 in an access network. In the DL, IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418 TX. Each transmitter 418 TX may modulate a radio frequency (RF) carrier with a respective spatial stream for transmission.

At the UE 450, each receiver 454 RX receives a signal through its respective antenna 452. Each receiver 454 RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, and the controller/processor 459 may be configured to perform aspects in connection with 198 of FIG. 1. At least one of the TX processor 416, the RX processor 470, and the controller/processor 475 may be configured to perform aspects in connection with 198 of FIG. 1.

Secure communications are important in wireless communications systems because wireless communication may suffer security breaches from eavesdropping devices. In some aspects, wireless communication may provide a higher-layer security scheme.

Figure 5:
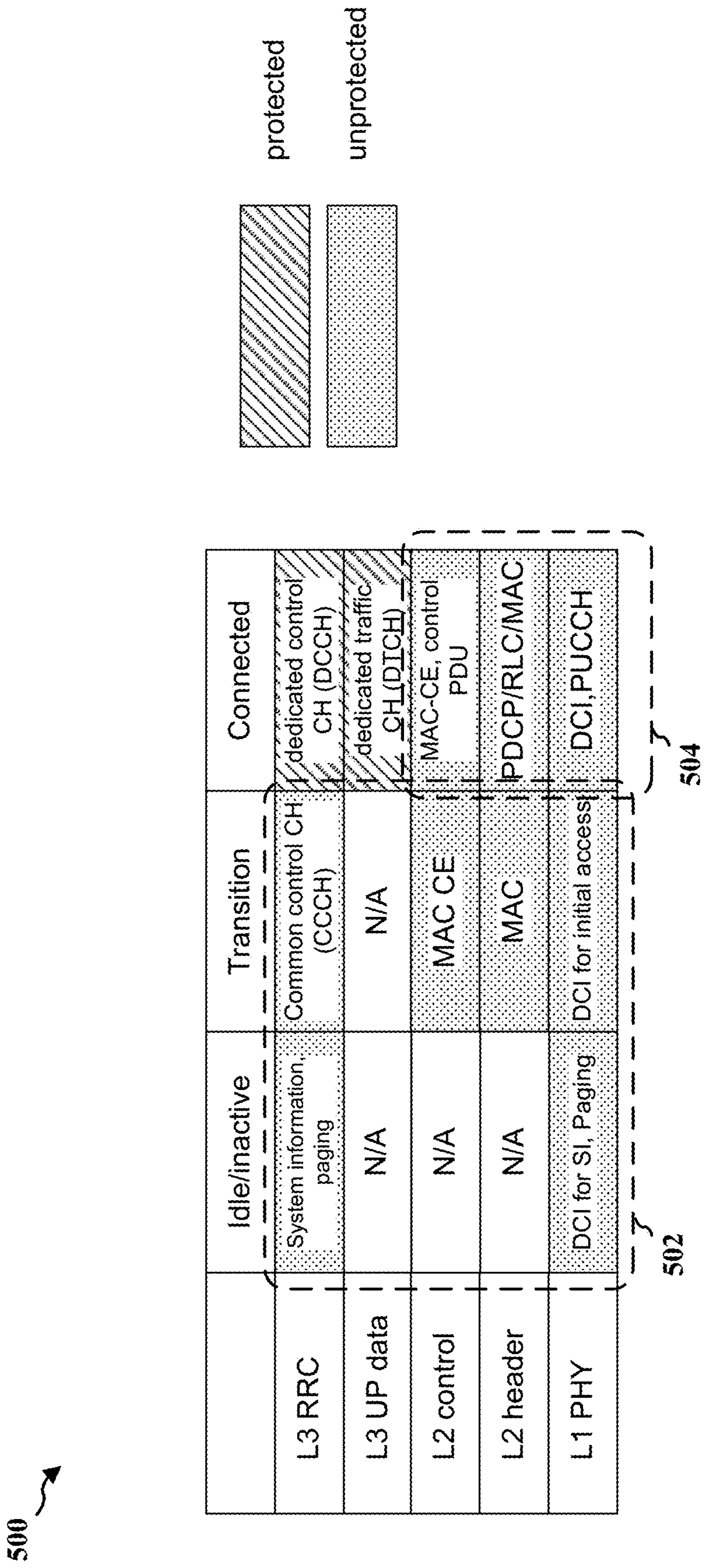
FIG. 5 illustrates an example of wireless communication.

FIG. 5 illustrates an example 500 of wireless communication. For example, the protected channels and/or signals may be associated with RRC status and the layer of the UE. In one aspect, a dedicated control channel (DCCH) on an L3 RRC layer and a dedicated traffic channel (DTCH) on an L3 UP data channel for the UE in the connected state may be protected by the higher layer security scheme. Accordingly, a first set of signals and/or channels 502 for the UE in the idle/inactive state or a transition state between the idle/inactive state and the connected state may not be protected, and a second set of signals and/or channels 504 on the lower layer for the UE in the connected state may not be protected. Particularly, the UE may be connected to a fake base station, and the unprotected signals and/or channels may cause issues. In one aspect, the UE connected to the fake base station in the idle/inactive state or the transition status may cause an out-of-service notice on the first set of signals and/or channels 502. In another aspect, the UE connected to the fake base station in the connected status may cause throughput degradation in the second set of signals and/or channels 504.

IoT includes many devices connected to each other and may have a higher level of security. In one aspect, the IoT devices have a relatively low level of power, and the IoT devices may add more security with additional security bits obtained from channels and sounding signals between the legit nodes.

In some aspects, after two wireless devices obtain a secret key that may be used for encrypting the communication between the two devices, the two devices may verify that the two wireless devices have the same secret key. The current disclosure may provide a method of verifying a secret key. For example, the two devices may include various combinations, including a UE and a UE, a base station and a UE, a UE and a wearable device, etc. In one aspect, the verification of the secret key may be under the condition of not revealing the key. The two wireless devices may verify the secret key to assume that the secret key is agreed between the two wireless devices, the two wireless devices may use the secret key to encrypt the communication between the two wireless devices.

The pair of wireless devices may provide the PHY layer security and provide the secret key sharing where a pair of devices (e.g., UEs) try to extract the same secret key from the channel and use them to secure some unsecured channels (such as a PSCCH, a PSFCH, and SCI 2 carried in a PSSCH) or to improve security from the PHY layer point-of-view (in addition to the upper-layer security). Also, the pair of wireless devices on a Uu link security may provide improved security for the PUCCH/DCI and PUSCH to improve the PHY security.

Figure 6A:
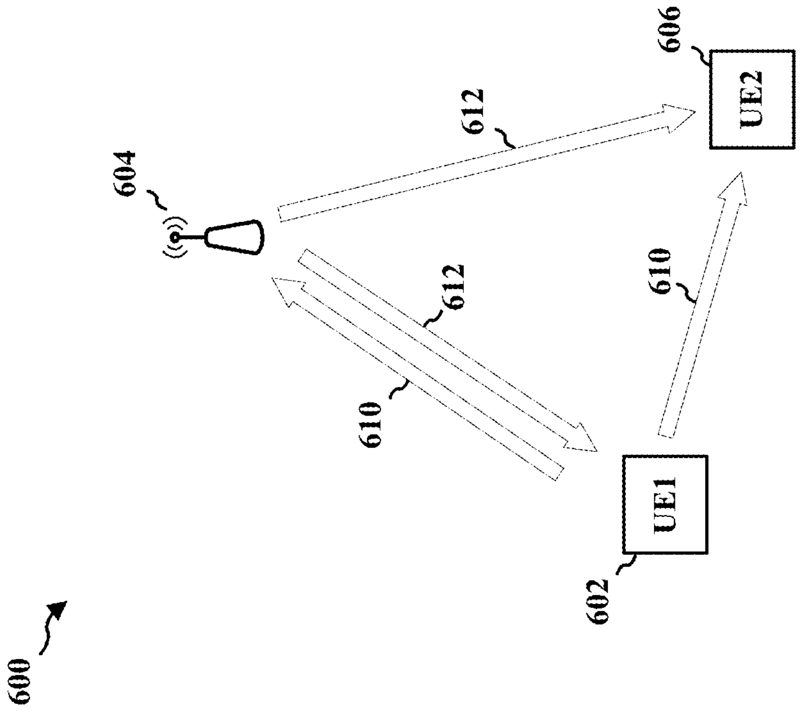
FIGS. 6A and 6B are diagrams illustrating examples of a wireless communication.
Figure 6B:
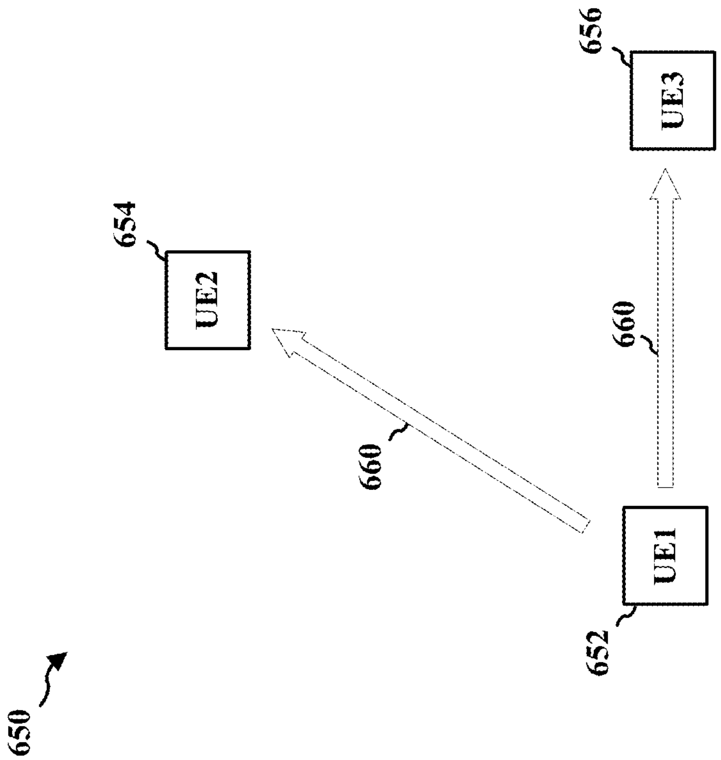

FIGS. 6A and 6B are diagrams illustrating examples of wireless communication. FIG. 6A is a diagram illustrating a first example 600 of a wireless communication system. The first example 600 may include a first UE 602 and a base station 604, and a second UE 606. Here, the first UE 602 and the base station 604 may communicate with each other, and the second UE 606 may be eavesdropping on the communication between the first UE 602 and the base station 604. That is, the first UE 602 may transmit a UL signal 610 to the base station 604, and the base station 604 may transmit a DL signal 612 to the first UE 602, and the second UE 606 may attempt to decode the UL signal 610 transmitted by the first UE 602 and/or the DL signal 612 transmitted by the base station 604. The first UE 602 and the base station 604 may provide a higher layer security scheme to prevent the second UE 606 from decoding the content of the communication signal based on the UL signal 610 or the DL signal 612.

In some aspects, a physical layer security scheme that depends on channel characteristics may be further provided to enhance the security of the control and data channels on the UL signal 610 and the DL signal 612, especially for those channels that are not covered by the higher-level security methods. For example, the first UE 602 and the base station 604 may extract a secret key for encrypting the data transmission between the first UE 602 and the base station 604. The second UE 606 may not be able to decode the data of the communication signal between the first UE 602 and the base station 604 without the secret key.

FIG. 6B is a diagram illustrating a second example 650 of a wireless communication system. The second example 650 may include a first UE 652 and a second UE 654, and a third UE 656. Here, the first UE 652 and the second UE 654 may communicate with each other over a sidelink communication, and the third UE 656 may be eavesdropping on the communication between the first UE 652 and the second UE 654. That is, the first UE 652 may transmit an SL signal 660 to the second UE 654, and the third UE 656 may attempt to decode the SL signal 660 transmitted by the first UE 652. The first UE 652 and the second UE 654 may provide a higher layer security scheme to prevent the third UE 656 from decoding the content of the communication signal based on the SL signal 660.

In some aspects, a physical layer security scheme that depends on channel characteristics may be further provided to enhance the security of the control and data channels on the SL signal 660. For example, the first UE 652 and the second UE 654 may provide physical layer security by transmitting the communication signal on CCs that are unknown to the third UE 656. For example, the first UE 652 and the second UE 654 may extract a secret key for encrypting the data transmission between the first UE 652 and the second UE 654. The third UE 656 may not be able to decode the data of the communication signal between the first UE 652 and the second UE 654 without the secret key.

In one aspect, two wireless devices may extract the secret key from channel randomness. First, the two wireless devices may send reference signals to each other. In one example, the two wireless devices may include a first UE and a second UE, and the first UE and the second UE may send reference signals to each other using sidelink communication. In another example, the two wireless devices may include a base station and a UE, and the base station may send the reference signal to the UE using a downlink transmission, and the UE may send the reference signal to the base station using an uplink transmission.

The two wireless devices may estimate the channels based on the received reference signals and obtain certain metrics based on the estimated channels. For example, the measured metric of the estimated channel may include channel power, a reference signal received power (RSRP), a signal-to-interference-plus-noise ratio (SINR), a phase, etc. The two wireless devices may quantize the mapped value of the metric, and the secret key may be obtained from both sides.

Here, the two wireless devices may be configured with the set of reference signals and the corresponding resources to follow the channel reciprocity so that the base station and the UE may select the same set of one or more CCs. Based on the channel reciprocity, the two wireless devices may obtain the same secret key from both sides. In cases with a high signal-to-noise ratio (SNR), extraction of the secret key at each side of the two wireless devices may have a reduced error. In the case with a low SNR, there may be a mismatch of the secret key extracted at each side of the two wireless devices from the channel noise, and the two wireless devices may perform repetition of pilot signals or a key refinement procedure.

In another aspect, the secret key may be configured by a third party. In one example, a third wireless device may generate the secret key and send the generated secret key to the first wireless device and the second wireless device. In another example, the first wireless device and the second wireless device may have a set of secret keys, and the third wireless device may send an indication to the first wireless device and the second wireless device identifying one secret key from the set of secret keys for the first wireless device and the second wireless device to use. In another example, the third wireless device may transmit at least one seed value to the first wireless device and the second wireless device, and the first wireless device and the second wireless device may generate the same secret key based on at least one seed value received from the third wireless device.

In one aspect, the two wireless devices may share the extracted secret keys to verify that the two devices have the same secret key. In another aspect, the two wireless devices may verify the extracted secret key without sharing the secret key. In response to determining that there is a mismatch of the extracted secret key, the secret key extraction process may be repeated, or more reference signals may be used. The two wireless devices may use the secret key to secure the transmissions by securing some information or fields within the physical channels. In one example, the physical channels in the sidelink connection may include the SCI, PSSCH, PSFCH, etc. In another example, the physical channels in the UU interface may include the DCI, PDCCH, PDSCH, UCI, PUCCH, PUSCH, etc.

In some aspects, the two wireless devices may verify the extracted secret key without sharing the secret key. That is, the first wireless device of the two wireless devices (UE-to-UE or gNB-to-UE) may try to tell the other device that the two wireless devices have the same secret key bits without revealing the key bits.

After obtaining the secret key using one of the methods of extracting the secret key, the first wireless device may encode the secret key to generate verification bits, and the first wireless device may transmit the verification bits to the second wireless device for verification. That is, the first wireless device may encode the secret key based on at least one of bitmap, a hash function, or a polynomial to generate the verification bits. Here, the verification bits may be generated in a manner similar to generating CRC or encoding parity bits. That is, the first wireless device may generate the verification bits based on the secret key, and the second wireless device may receive the verification bits and verify that the second wireless device may verify that the first wireless device and the second wireless device has the secret key based on the verification bits. However, a third wireless device may not reverse-engineer the verification bits to obtain the secret key.

In one aspect, the first wireless device may apply a bit-level module 2 operation on one or more secret key bits of the secret key. The bit-level module 2 operation may refer to applying a bitmap to the secret key. For example, if the secret key is 00101110 and the bitmap of the bit-level module 2 operation is 11000110, then the outcome of the bit-level module 2 operation may be 0011 (i.e., 00101110).

The first wireless device may apply the operation such as a polynomial or CRC creation to generate the verification bits. For example, the first device may generate the first bit $X_1$=AND (first bit, last bit) and the second bit $X_2$=AND (remaining bits). In one aspect, the first wireless device may send, to the second wireless device, both of the two bits $X_1$ and $X_2$ as the verification bits. In another aspect, the first wireless device may send, to the second wireless device, any modification of the two bits $X_1$ and $X_2$. For example, the first wireless device may send a single bit $X_3$=XOR ($X_1$, $X_2$).

In another aspect, the first wireless device may use a collision resistance hash function on the secret key to map the data of an arbitrary size to fixed-size values before encoding the secret key. That is, assuming the secret key in decimal is L1, the first wireless device may apply F(L1)=L2. Then, the first wireless device may convert L2 to binary and apply the encoding procedure. Adding the hash function purpose may not block reversing the hash value to secret key bits in a polynomial time, but may add more security since the attacker may need a large amount of time to decrypt a single key.

The first wireless device may transmit the verification bits to the second wireless device as a response to the reference signals dedicated to extracting the secret key. That is, after the first wireless device extracts the secret key based on the reference signals received from the second wireless device, the first wireless device may transmit the verification bits to the second wireless device as a part of the response to the reference signals that the first wireless device used to extract the secret key. In one aspect, the first wireless device may be a UE and the second wireless device may a base station with the Uu interface, and the first wireless device may transmit one or two bits of the verification bits to the base station in a PUCCH, preferably format 0, based on a certain configured scheduling (CS) configured by the base station. In another aspect, the first wireless device may be a first UE and the second wireless device may be a second UE with the sidelink connection, and the first wireless device may send the verification bits to the second wireless device in the PSFCH associated with the PSSCH carrying the reference signal.

In some aspects, to add extra randomness and confusion at attackers, the first wireless device may determine the physical resource block (PRB) to carry the verification bits to the second wireless device based at least in part on the verification bits. That is, the first wireless device may send the verification bits on a k-th resource, where k is obtained partially based on the secret key or hashed value of the key. Because the attacker may not know the key, they may need to decode all the resources to obtain the verification bits. The first wireless device may be configured to assign the PRB to carry the verification bits when a secret key agreement session is triggered between the first wireless device and the second wireless device.

In the case of the Uu link, where the two wireless devices include a base station and a UE, the base station may configure multiple PRBs, and one of the PRB may be selected partially based on a hashed value of the secret key. In one aspect, where the first wireless device is the UE and the second wireless device is the base station, the second wireless device may configure multiple PUCCH resources, and the physical resource is selected partially based on the secret key hashed value to carry the verification bits. For example, Y physical resources may be labelled as 1, 2, 3, . . . , Y, and the UE may select on physical resource from the Y physical resources based at least in part on the hashed value of the secret key. In another aspect, where the first wireless device is the base station and the second wireless device is the UE, the second wireless device may select, among multiple PDCCH or PDSCH resources, the physical resource partially based on the secret key hashed value to carry the verification bits. Furthermore, a part of the resource, e.g., time and/or frequency of the resource, may be used based on the secret key.

Figure 7:
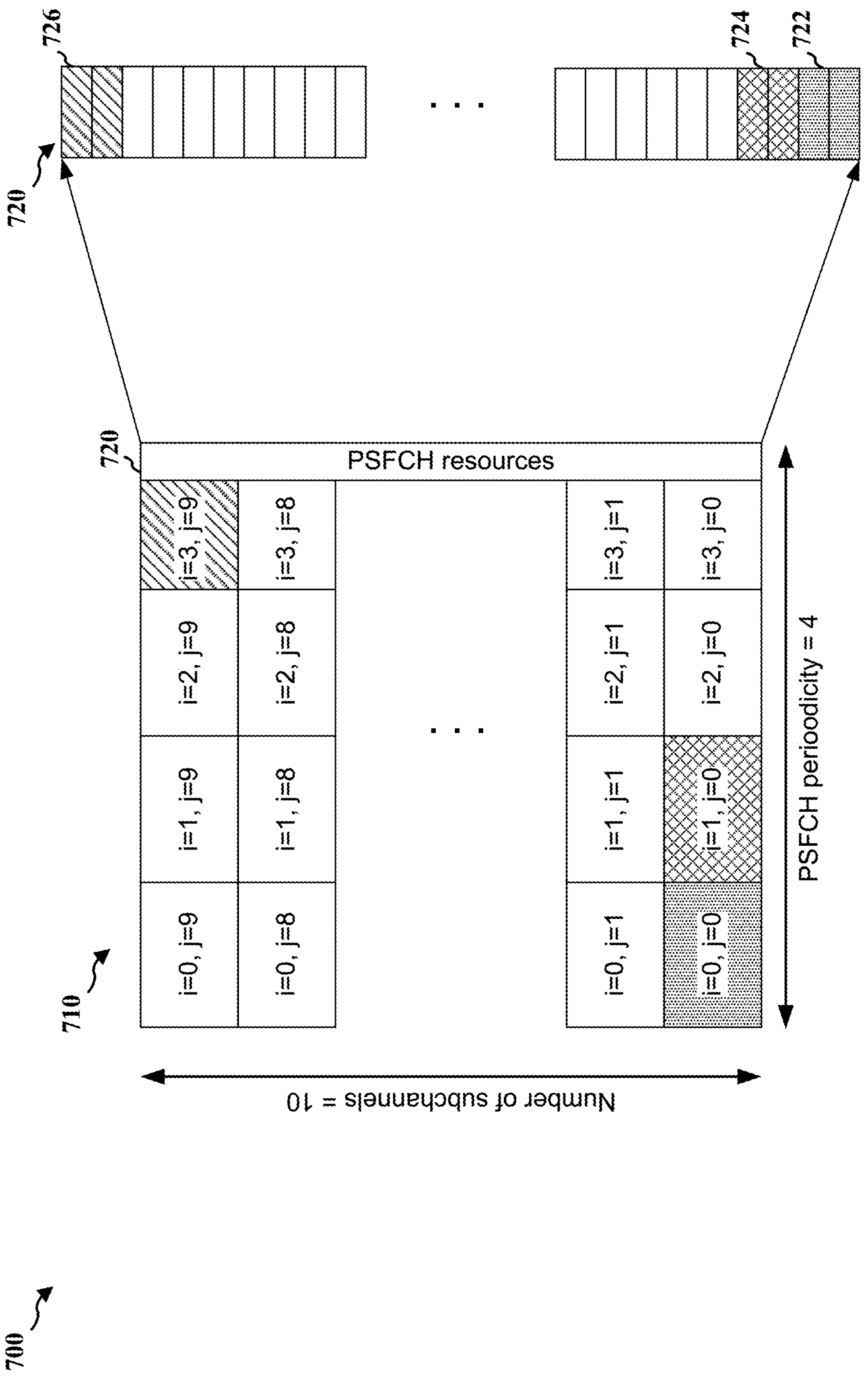
FIG. 7 is an example of assigning PSFCH resources in sidelink communication.

In the case of the sidelink, where the two wireless devices include a first UE and a second UE, the first wireless device may assign PSFCH resources to carry the verification bits. FIG. 7 is an example 700 of assigning PSFCH resources in sidelink communication. The example 700 may include a first set of PRBs 710 for the PSSCH and a second set of PRBs 720 assigned for the PSFCH.

The PSFCH resource may be mapped based on the corresponding PSSCH resource. The mapping between the PSSCH resource and the corresponding PSFCH resource may be based on at least one of the following: the starting sub-channel of the PSSCH (e.g., sl-PSFCH-CandidateResourceType may be configured as startSubCH) or the number of sub-channels in the PSSCH (e.g., sl-PSFCH-CandidateResourceType configured as allocSubCH), the slot containing the PSSCH, the source ID, or the destination ID. The number of available PSFCH resources may be greater than or equal to the number of UEs in group cast option 2.

The UE may allocate $$[(i + j.N_{PSSCH}^{PSFCH}) \cdot M_{subch,slot}^{PSFCH}, (i + 1 + j \cdot N_{PSSCH}^{PSFCH}) \cdot M_{subch,slot}^{PSFCH} - 1]$$

PRBs from $$M_{PRB,set}^{PSFCH}$$

PRBs for the PSSCH on the slot i and the sub-channel j. Here, $$0 \le i \le N_{PSSCH}^{PSFCH} \text{ and } 0 \le j \le N_{subch}.$$

In some aspects, $$M_{subch,slot}^{PSFCH} = \frac{M_{PRB,set}^{PSFCH}}{N_{subch} \cdot N_{PSSCH}^{PSFCH}},$$

where $$N_{PSSCH}^{PSFCH}$$

may refer to a number of the PSSCH slots associated with the PSFCH slot. For example, $$N_{PSSCH}^{PSFCH}$$

may be determined by periodPSFCHresource. The parameter periodPSFCHresource may indicate the PFSCH periodicity, in a number of slots, in a resource pool. It can be set to {0,1,2,4}. If it is set to 0, the PSFCH transmissions from the UE in the resource pool may be disabled.

The UE may transmit the PSFCH in a first slot that includes PSFCH resources and in at least a number of slots of the resource pool after a last slot of the PSSCH reception.

A parameter MinTimeGapPSFCH may provide the number of slots. A parameter rbSetPSFCH may refer to a set of $$M_{PRB,set}^{PSFCH}$$

PRBs in a resource pool for PSFCH transmission. A parameter numSubchannel may refer to a number of sub-channels $N_{subch}$ for the resource pool.

For example, $$N_{PSSCH}^{PSFCH}$$

may be 4, which represents the PSFCH periodicity, $N_{subch}$ may be 10, which represents the number of subchannels for the resource pool. Accordingly, $$M_{subch,slot}^{PSFCH} = 80/(4*10) = 2,$$

and therefore, 80 PRBs may be assigned for the corresponding PSFCH. For each slot and subchannel, two PRBs may be sequentially assigned for the corresponding PSFCH. In one example, the first two PRBs 722 may be assigned for the PSFCH corresponding to the PSSCH on slot 0, subchannel 0. In another example, the second two PRBs 724 may be assigned for the PSFCH corresponding to the PSSCH on slot 1, subchannel 0. In another example, the last two PRBs 726 may be assigned for the PSFCH corresponding to the PSSCH on slot 3, subchannel 9. According to the example 700, two PRBs may be assigned for communicating the PSFCH including the verification bits; however, the PSCFH may be sent on one of the two PRBs assigned for communicating the PSFCH. The first wireless device may select the one PRB based on the secret key or the hashed value of the secret key.

Figure 8:
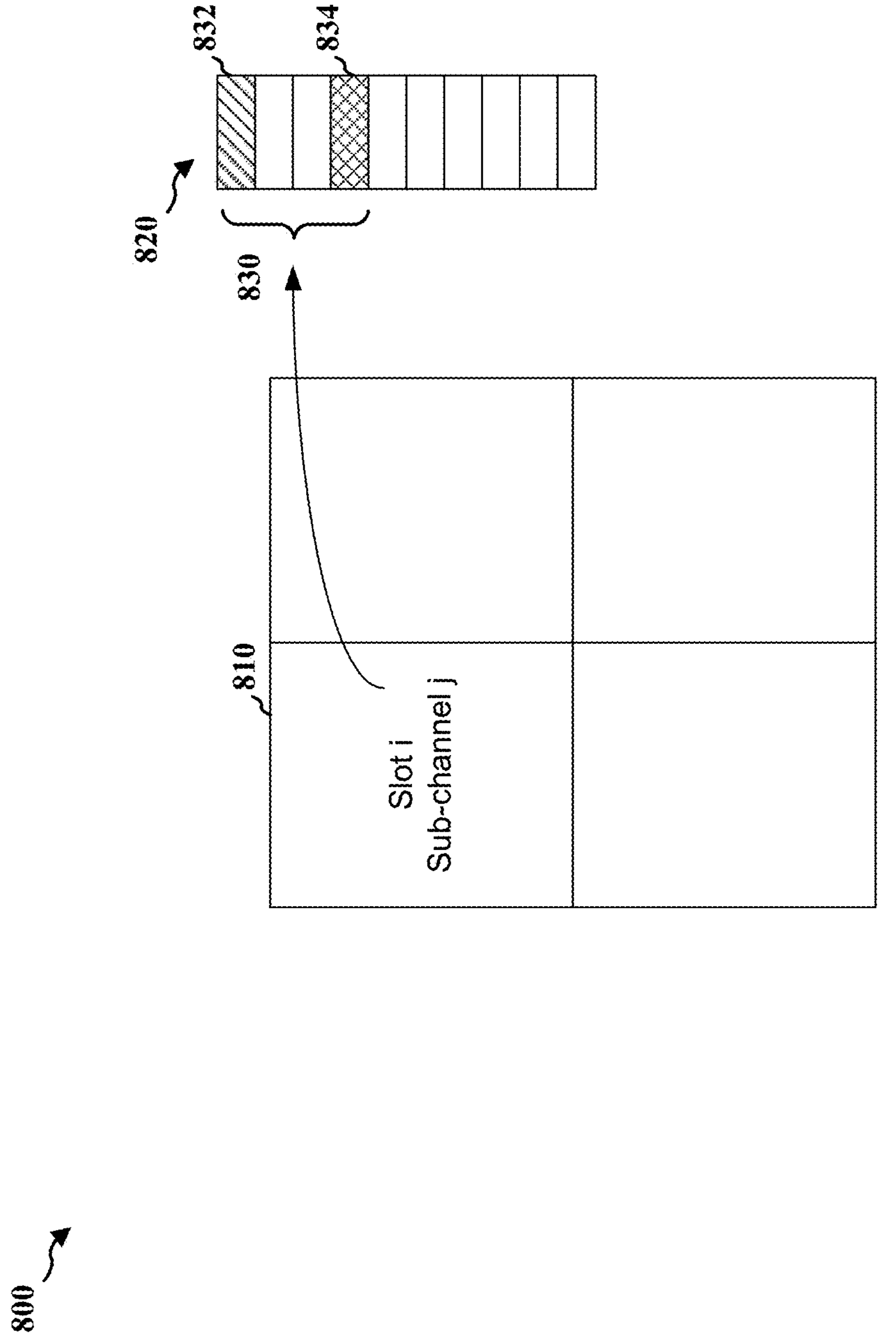
FIG. 8 is an example of assigning PSFCH resources in sidelink communication.

FIG. 8 is an example 800 of assigning PSFCH resources in sidelink communication. The example 800 may include a first set of PRBs 810 for the PSSCH and a second set of PRBs 820 assigned for the PSFCH and illustrate how the first wireless device may select the PRB among the second set of PRBs 820 for transmitting the PSFCH carrying the verification bits.

In some aspects, the first wireless device may select one of the PRBs based on the source ID, destination ID or the hashed secret key. For example, the first wireless device may select the i-th PRB, where i=(source ID+destination ID+hashed secret key) mod X, and X refers to the number of PSFCH resources based on the starting sub-channel of PSSCH or the number of subchannels in a PSSCH. Here, the hashed secret key may include randomizing the secret key or the hashed secret key based on some procedure agreed at both of the two wireless devices.

The example 800 illustrates that the source ID and the destination ID are 0, and that X=4, where X refers to the number of PSFCH resources based on the starting sub-channel of PSSCH or the number of subchannels in a PSSCH. The first wireless device may select one PRB from the 4 PRBs 830 to transmit the PSFCH. The first wireless device may not be in the secret key agreement session, and the first wireless device may determine to select the PRB0 832 based on i=(0+0+0) mod 4=0. The first wireless device may be in the secret key agreement session, and assuming that a hashed key value in decimal or maybe after another hashing or modification is 3, the first wireless device may determine to select the PRB3 834 based on i=(0+0+3) mod 4=3.

The second wireless device may decode the one or more verification bits received from the first wireless device based on at least one of a bitmap, a hash function, or a polynomial, such that the decoded one or more verification bits correspond to one or more secret key bits of the at least one secret key. Because the second wireless device and the first wireless device shares the agreement on the encoding the secret key based on at least one of a bitmap, the hash function, or the polynomial, the second wireless device may verify that the secret key obtained by the first wireless device matches the secret key obtained by the second wireless device based on the received verification bits. For example, the second wireless device may apply the same operation to the secret key obtained to generate one or more verification bits and compare the generated one or more verification bits with the one or more verification bits received from the first wireless device.

The second wireless device may transmit the feedback to the first wireless device based on the verification bits received from the first wireless device. The feedback may be configured periodic, semi-persistent, or aperiodic, and the feedback may be transmitted on periodic, semi-persistent, or aperiodic resources.

If the second wireless device determines that there is an agreement of the secret key between the first wireless device and the second wireless device, the second wireless device may transmit an ACK message to the first wireless device. On the UU link, the ACK message may be transmitted on the UCI or the DCI, and on the sidelink link, the ACK message may be transmitted on the SCI.

In one aspect, the first wireless device and the second wireless may assign an ID for each secret key, i.e., a secret-key-ID, and the feedback may include an activation flag of a key_under_use, indicating the secret-key-ID of the secret key that is in an agreement between the first wireless device and the second wireless device. The feedback may be transmitted via at least one of a radio resource control (RRC) message or a medium access control (MAC) control element (CE) (MAC-CE). In one example, the feedback indicating the activation flag of the key_under_use may be transmitted on the MAC-CE. In another example, the second wireless device that is the base station may transmit the RRC message configuring a set of secret-key-IDs and transmit the MAC-CE to indicate the activation flag of the key_under_use by activating one secret-key-ID from the set of secret-key-IDs.

If the second wireless device determines that there is a mismatch of the secret key between the first wireless device and the second wireless device, the second wireless device may attempt to fix the mismatch. In one aspect, the second wireless device may update the current channel estimation used for key extraction by transmitting more reference signal resources for key determination, increasing the repetitions of the resources or using the reference signal with a higher repetition, or increasing the transmission power of the reference signal. In another aspect, the second wireless device may restart the secret key sharing procedure by transmitting more reference signal resources for the secret key determination, increasing the repetitions of the resource or using reference signal with a higher repetition, or increasing the transmission power of the reference signal.

Figure 9:
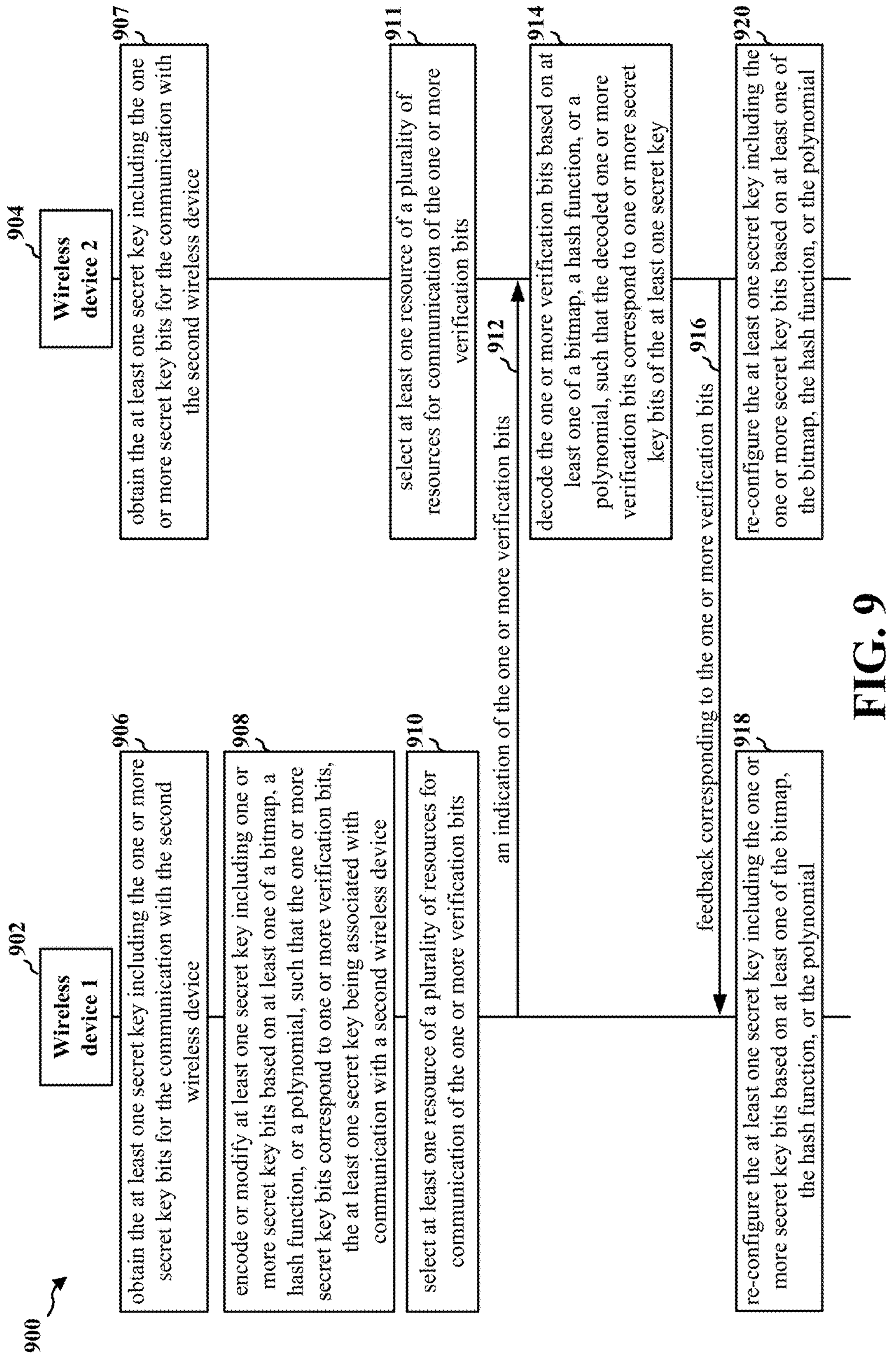
FIG. 9 is a call-flow diagram of a method of wireless communication.

FIG. 9 is a call-flow diagram 900 of a method of wireless communication. The call-flow diagram 900 may include a first wireless device 902 and a second wireless device 904. The first wireless device 902 may include a UE (e.g., the UE 104) or a base station (e.g., the base station 102/180), and the second wireless device 904 may include a UE (e.g., the UE 104) or a base station (e.g., the base station 102/180). The first wireless device 902 may generate one or more verification bits based on one or more secret keys, and transmit to the second wireless device 904 the indication of the one or more verification bits. The second wireless device 904 may receive the indication of the one or more verification bits, decode the one or more verification bits, and transmit feedback to the first wireless device 902.

At 906, the first wireless device 902 may obtain the at least one secret key including the one or more secret key bits for the communication with the second wireless device 904. In some aspects, at least one secret key may be generated based on channel randomness or obtained from a third wireless device. In one aspect, the two wireless devices may send reference signals to each other and generate the secret key from each end based on certain metrics obtained from the estimated channel carrying the reference signal. In another aspect, the secret key may be configured by a third party.

At 907, the second wireless device 904 may obtain the at least one secret key including the one or more secret key bits for the communication with the first wireless device 902. In some aspects, at least one secret key may be generated based on channel randomness or obtained from a third wireless device. In one aspect, the two wireless devices may send reference signals to each other and generate the secret key from each end based on certain metrics obtained from the estimated channel carrying the reference signal. In another aspect, the secret key may be configured by a third party.

At 908, the first wireless device 902 may encode or modify at least one secret key including one or more secret key bits based on at least one of a bitmap, a hash function, or a polynomial, such that the one or more secret key bits correspond to one or more verification bits, the at least one secret key associated with communication with a second wireless device 904. Here, the verification bits may be generated in a manner similar to generating CRC or encoding parity bits. That is, the first wireless device 902 may generate the verification bits based on the secret key, and the second wireless device 904 may receive the verification bits and verify that the second wireless device 904 may verify that the first wireless device 902 and the second wireless device 904 has the secret key based on the verification bits. However, a third wireless device may not reverse-engineer the verification bits to obtain the secret key. In one aspect, the first wireless device 902 may apply a bit-level module 2 operation on the one or more secret key bits of the secret key and apply operation such as a polynomial or CRC creation to generate the verification bits. In another aspect, the first wireless device 902 may use a collision resistance hash function on the secret key before applying the bit-level module 2 operation and the polynomial or CRC creation operation.

At 910, the first wireless device 902 may select the at least one resource is for communication of the one or more verification bits based on at least one of a source ID of the first wireless device 902, a destination ID of the second wireless device 904, or the at least one secret key obtained at 906. In some aspects, the first wireless device 902 may determine the PRB to transmit the verification bits to the second wireless device 904 based at least in part on the verification bits. In one aspect, the two wireless devices may include a base station and a UE in the Uu link, and the base station may configure multiple PRBs, and one of the PRB may be selected partially based on a hashed value of the secret key. In another aspect, the two wireless devices may include a first UE and a second UE in the sidelink, and the first wireless device 902 may assign PSFCH resources to carry the verification bits. The first wireless device 902 may select one PSFCH resource from a set of resources assigned for PSFCH to carry the PSFCH based at least in part on the secret key or the verification bits.

At 911, the second wireless device 904 may select the at least one resource is for communication of the one or more verification bits based on at least one of a source ID of the first wireless device 902, a destination ID of the second wireless device 904, or the at least one secret key obtained at 907. In some aspects, the second wireless device 904 may determine the PRB to receive the verification bits from the first wireless device 902 based at least in part on the verification bits. In one aspect, the two wireless devices may include a base station and a UE in the Uu link, and the base station may configure multiple PRBs, and one of the PRB may be selected partially based on a hashed value of the secret key. In another aspect, the two wireless devices may include a first UE and a second UE in the sidelink, and the second wireless device 904 may determine the PSFCH resources to receive the verification bits from the first wireless device 902. The second wireless device 904 may select one PSFCH resource from a set of resources assigned for PSFCH to receive the PSFCH based at least in part on the secret key or the verification bits.

At 912, the first wireless device 902 may transmit, to the second wireless device 904, an indication of the one or more verification bits. The first wireless device 902 may transmit the indication of the one or more verification bits on the at least one resource selected at 910 for communication of the one or more verification bits. The second wireless device 904 may receive, from the first wireless device 902 via at least one resource, an indication of one or more verification bits, the one or more verification bits corresponding to at least one secret key, the at least one secret key being associated with communication with the first wireless device 902. The second wireless device 904 may receive the indication of the one or more verification bits on the at least one resource selected at 911 for communication of the one or more verification bits.

At 914, The second wireless device 904 may decode the one or more verification bits based on at least one of a bitmap, a hash function, or a polynomial, such that the decoded one or more verification bits correspond to one or more secret key bits of the at least one secret key. In one aspect, the second wireless device 904 may apply the same operation to the secret key obtained at 907 to generate one or more verification bits and compare the generated one or more verification bits with the one or more verification bits received from the first wireless device 902 at 912.

At 916, the second wireless device 904 may transmit, to the first wireless device 902, feedback corresponding to the decoded one or more verification bits. The first wireless device 902 may receive, from the second wireless device 904, feedback corresponding to the one or more verification bits. In one aspect, the feedback may be an ACK or a NACK, transmitted and received via at least one of the SCI, the UCI, or the DCI. If the second wireless device 904 determines that there is an agreement of the secret key between the first wireless device 902, and the second wireless device 904, the second wireless device 904 may transmit an ACK message to the first wireless device 902. On the UU link, the ACK message may be transmitted on the UCI or the DCI, and on the sidelink link, the ACK message may be transmitted on the SCI. In another aspect, the feedback may include an identifier of the at least one secret key associated with the one or more verification bits. The feedback may include the identifier of the at least one secret key associated with the one or more verification bits. That is, each secret key may be assigned with an ID, i.e., secret-key-ID, and the feedback may include an activation flag of a key_under_use, indicating the secret-key-ID of the secret key that is in an agreement between the first wireless device 902 and the second wireless device 904. The feedback including the identifier of the at least one secret key may be transmitted and received via at least one of an RRC message or a MAC-CE.

At 918, in response to the feedback received at 916 being NACK, the first wireless device 902 may re-configure the at least one secret key including the one or more secret key bits based on at least one of the bitmap, the hash function, or the polynomial. In some aspects, the re-configuration of the at least one secret key may include at least one of transmitting one or more reference signal resources for key determination, increasing one or more resource repetitions, using a reference signal with a higher repetition, or increasing a transmission power of the reference signal.

At 920, in response to the feedback transmitted at 916 being NACK, the second wireless device 904 may re-configure the at least one secret key including the one or more secret key bits based on at least one of the bitmap, the hash function, or the polynomial. In some aspects, the re-configuration of the at least one secret key may include at least one of transmitting one or more reference signal resources for key determination, increasing one or more resource repetitions, using a reference signal with a higher repetition, or increasing a transmission power of the reference signal.

Figure 10:
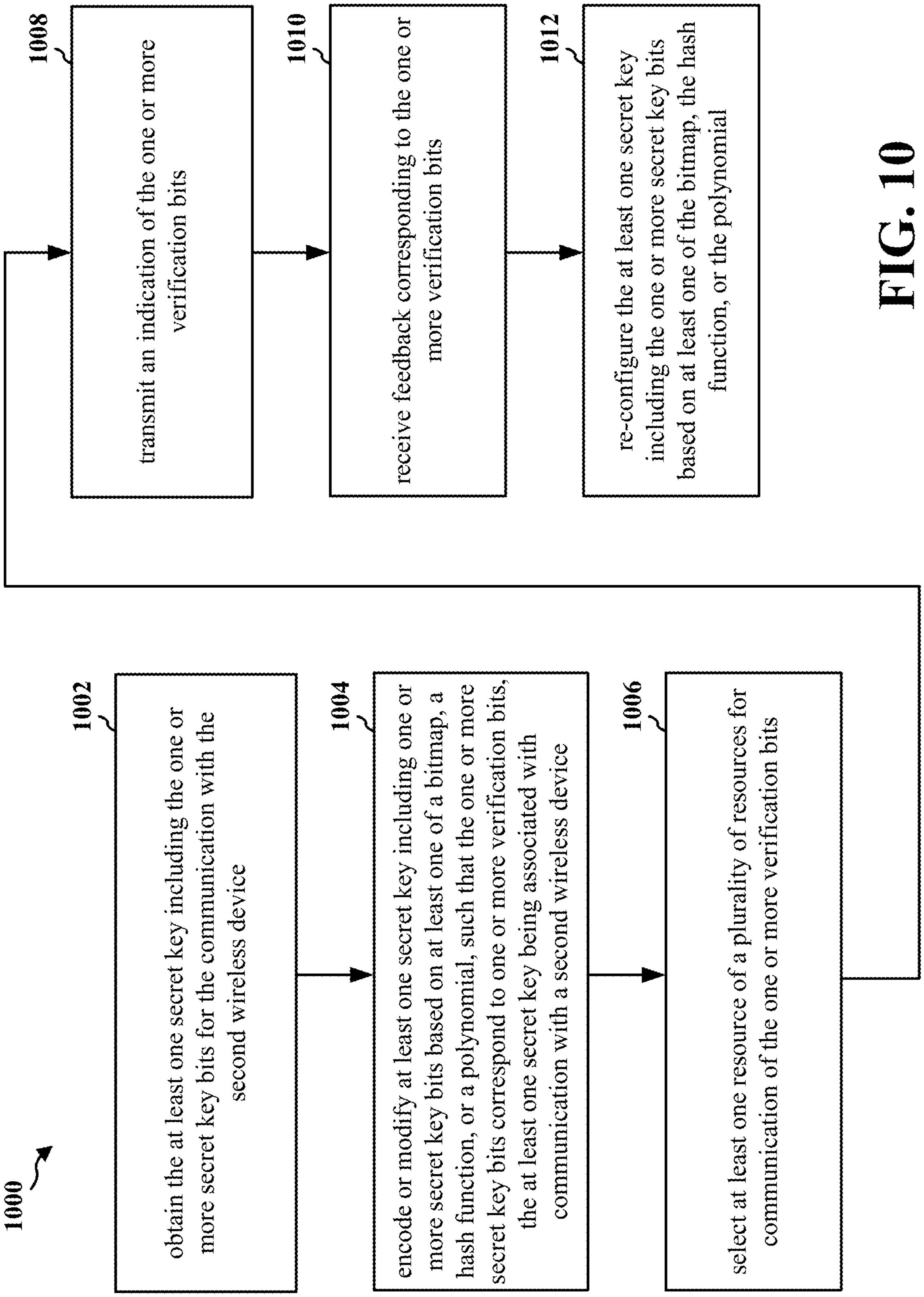
FIG. 10 is a flow chart of a method of wireless communication.

FIG. 10 is a flowchart 1000 of a method of wireless communication. The method may be performed by a first wireless device (e.g., the first wireless device 902), which may include a UE (e.g., the UE 104; the apparatus 1402) or a base station (e.g., the base station 102/180; the apparatus 1502). The first wireless device may generate one or more verification bits based on one or more secret key, and transmit, to the second wireless device the indication of the one or more verification bits. The first wireless device may receive a feedback from the second wireless device.

At 1002, the first wireless device may obtain the at least one secret key including the one or more secret key bits for the communication with the second wireless device. In some aspects, at least one secret key may be generated based on channel randomness or obtained from a third wireless device. In one aspect, the two wireless devices may send reference signals to each other and generate the secret key from each end based on certain metrics obtained from the estimated channel carrying the reference signal. In another aspect, the secret key may be configured by a third party. For example, at 906, the first wireless device 902 may obtain the at least one secret key including the one or more secret key bits for the communication with the second wireless device 904. Furthermore, 1002 may be performed by a secret key configuring component 1440 or a secret key configuring component 1540.

At 1004, the first wireless device may encode or modify at least one secret key including one or more secret key bits based on at least one of a bitmap, a hash function, or a polynomial, such that the one or more secret key bits correspond to one or more verification bits, the at least one secret key associated with communication with a second wireless device. Here, the verification bits may be generated in a manner similar to generating CRC or encoding parity bits. That is, the first wireless device 902 may generate the verification bits based on the secret key, and the second wireless device 904 may receive the verification bits and verify that the second wireless device 904 may verify that the first wireless device 902 and the second wireless device 904 has the secret key based on the verification bits. However, a third wireless device may not reverse-engineer the verification bits to obtain the secret key. In one aspect, the first wireless device 902 may apply a bit-level module 2 operation on the one or more secret key bits of the secret key and apply operation such as a polynomial or CRC creation to generate the verification bits. In another aspect, the first wireless device 902 may use a collision resistance hash function on the secret key before applying the bit-level module 2 operation and the polynomial or CRC creation operation. For example, at 908, the first wireless device 902 may encode or modify at least one secret key including one or more secret key bits based on at least one of a bitmap, a hash function, or a polynomial, such that the one or more secret key bits correspond to one or more verification bits, the at least one secret key associated with communication with a second wireless device 904. Furthermore, 1004 may be performed by a verification bits component 1442 or a verification bits component 1542.

At 1006, the first wireless device may select the at least one resource is for communication of the one or more verification bits based on at least one of a source ID of the first wireless device, a destination ID of the second wireless device, or the at least one secret key obtained at 1002. In some aspects, the first wireless device may determine the PRB to transmit the verification bits to the second wireless device based at least in part on the verification bits. In one aspect, the two wireless devices may include a base station and a UE in the Uu link, and the base station may configure multiple PRB s, and one of the PRB may be selected partially based on a hashed value of the secret key. In another aspect, the two wireless devices may include a first UE and a second UE in the sidelink, and the first wireless device may assign PSFCH resources to carry the verification bits. The first wireless device may select one PSFCH resource from a set of resources assigned for PSFCH to carry the PSFCH based at least in part on the secret key or the verification bits. For example, at 910, the first wireless device 902 may select the at least one resource is for communication of the one or more verification bits based on at least one of a source ID of the first wireless device 902, a destination ID of the second wireless device 904, or the at least one secret key obtained at 906. Furthermore, 1006 may be performed by a physical resource selecting component 1444 or a physical resource selecting component 1544.

At 1008, the first wireless device may transmit, to the second wireless device, an indication of the one or more verification bits. The first wireless device may transmit the indication of the one or more verification bits on the at least one resource selected at 1006 for communication of the one or more verification bits. For example, at 912, the first wireless device 902 may transmit, to the second wireless device 904, an indication of the one or more verification bits. Furthermore, 1008 may be performed by the verification bits component 1442 or the verification bits component 1542.

At 1010, the first wireless device may receive, from the second wireless device, feedback corresponding to the one or more verification bits. In one aspect, the feedback may be an ACK or a NACK, received via at least one of the SCI, the UCI, or the DCI. If the second wireless device determines that there is an agreement of the secret key between the first wireless device and the second wireless device, the second wireless device may transmit an ACK message to the first wireless device. On the UU link, the ACK message may be transmitted on the UCI or the DCI, and on the sidelink link, the ACK message may be received on the SCI. In another aspect, the feedback may include an identifier of the at least one secret key associated with the one or more verification bits. The feedback may include the identifier of the at least one secret key associated with the one or more verification bits. That is, each secret key may be assigned with an ID, i.e., secret-key-ID, and the feedback may include an activation flag of a key_under_use, indicating the secret-key-ID of the secret key that is in an agreement between the first wireless device and the second wireless device. The feedback including the identifier of the at least one secret key may be received via at least one of an RRC message or a MAC-CE. For example, at 916, the first wireless device 902 may receive, from the second wireless device 904, feedback corresponding to the one or more verification bits. Furthermore, 1010 may be performed by a feedback component 1446 or a feedback component 1546.

At 1012, in response to the feedback received at 1010 being NACK, the first wireless device may re-configure the at least one secret key including the one or more secret key bits based on at least one of the bitmap, the hash function, or the polynomial. In some aspects, the re-configuration of the at least one secret key may include at least one of transmitting one or more reference signal resources for key determination, increasing one or more resource repetitions, using a reference signal with a higher repetition, or increasing a transmission power of the reference signal. For example, at 918, the first wireless device 902 may re-configure the at least one secret key including the one or more secret key bits based on at least one of the bitmap, the hash function, or the polynomial. Furthermore, 1012 may be performed by the secret key configuring component 1440 or the secret key configuring component 1540.

Figure 11:
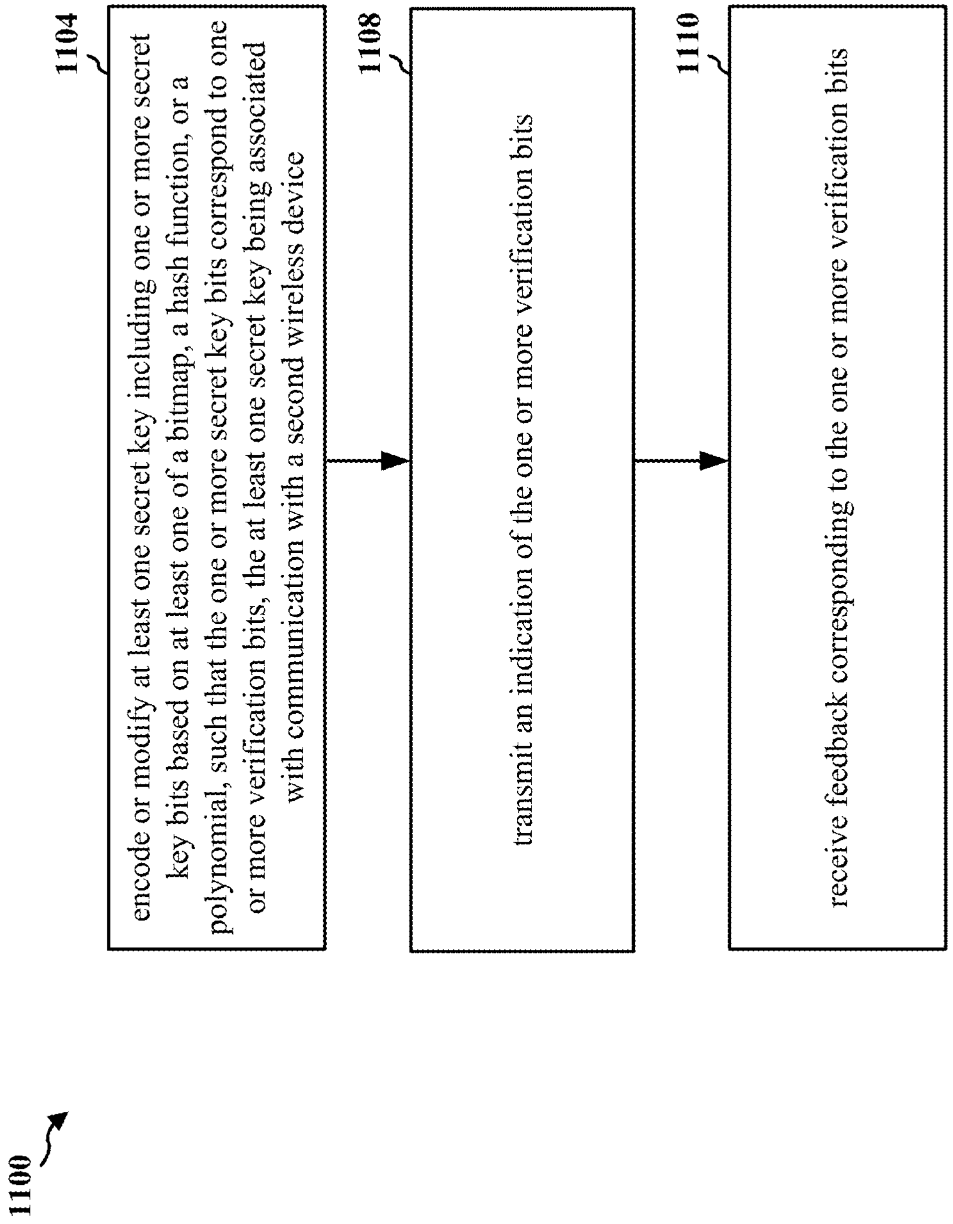
FIG. 11 is a flow chart of a method of wireless communication.

FIG. 11 is a flowchart 1100 of a method of wireless communication. The method may be performed by a first wireless device (e.g., the first wireless device 902), which may include a UE (e.g., the UE 104; the apparatus 1402) or a base station (e.g., the base station 102/180; the apparatus 1502). The first wireless device may generate one or more verification bits based on one or more secret key, and transmit, to the second wireless device the indication of the one or more verification bits. The first wireless device may receive a feedback from the second wireless device.

At 1104, the first wireless device may encode or modify at least one secret key including one or more secret key bits based on at least one of a bitmap, a hash function, or a polynomial, such that the one or more secret key bits correspond to one or more verification bits, the at least one secret key associated with communication with a second wireless device. Here, the verification bits may be generated in a manner similar to generating CRC or encoding parity bits. That is, the first wireless device 902 may generate the verification bits based on the secret key, and the second wireless device 904 may receive the verification bits and verify that the second wireless device 904 may verify that the first wireless device 902 and the second wireless device 904 has the secret key based on the verification bits. However, a third wireless device may not reverse-engineer the verification bits to obtain the secret key. In one aspect, the first wireless device 902 may apply a bit-level module 2 operation on the one or more secret key bits of the secret key and apply operation such as a polynomial or CRC creation to generate the verification bits. In another aspect, the first wireless device 902 may use a collision resistance hash function on the secret key before applying the bit-level module 2 operation and the polynomial or CRC creation operation. For example, at 908, the first wireless device 902 may encode or modify at least one secret key including one or more secret key bits based on at least one of a bitmap, a hash function, or a polynomial, such that the one or more secret key bits correspond to one or more verification bits, the at least one secret key associated with communication with a second wireless device 904. Furthermore, 1104 may be performed by a verification bits component 1442 or a verification bits component 1542.

At 1108, the first wireless device may transmit, to the second wireless device, an indication of the one or more verification bits. The first wireless device may transmit the indication of the one or more verification bits on the at least one resource selected for communication of the one or more verification bits. For example, at 912, the first wireless device 902 may transmit, to the second wireless device 904, an indication of the one or more verification bits. Furthermore, 1108 may be performed by the verification bits component 1442 or the verification bits component 1542.

At 1110, the first wireless device may receive, from the second wireless device, feedback corresponding to the one or more verification bits. In one aspect, the feedback may be an ACK or a NACK, received via at least one of the SCI, the UCI, or the DCI. If the second wireless device determines that there is an agreement of the secret key between the first wireless device and the second wireless device, the second wireless device may transmit an ACK message to the first wireless device. On the UU link, the ACK message may be transmitted on the UCI or the DCI, and on the sidelink link, the ACK message may be received on the SCI. In another aspect, the feedback may include an identifier of the at least one secret key associated with the one or more verification bits. The feedback may include the identifier of the at least one secret key associated with the one or more verification bits. That is, each secret key may be assigned with an ID, i.e., secret-key-ID, and the feedback may include an activation flag of a key_under_use, indicating the secret-key-ID of the secret key that is in an agreement between the first wireless device and the second wireless device. The feedback including the identifier of the at least one secret key may be received via at least one of an RRC message or a MAC-CE. For example, at 916, the first wireless device 902 may receive, from the second wireless device 904, feedback corresponding to the one or more verification bits. Furthermore, 1110 may be performed by a feedback component 1446 or a feedback component 1546.

Figure 12:
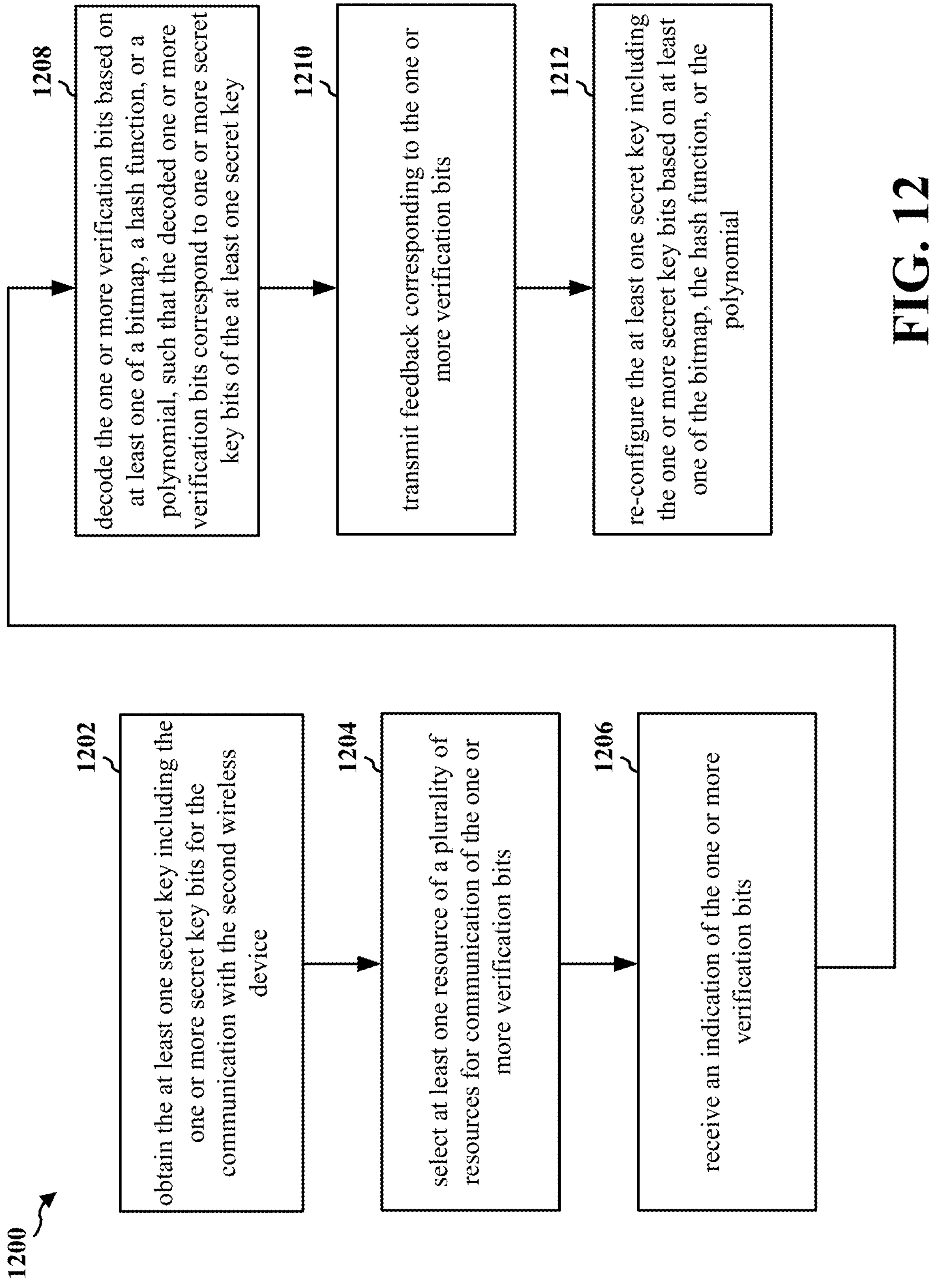
FIG. 12 is a flow chart of a method of wireless communication.

FIG. 12 is a flowchart 1200 of a method of wireless communication. The method may be performed by a second wireless device (e.g., the second wireless device 904), which may include a UE (e.g., the UE 104; the apparatus 1402) or a base station (e.g., the base station 102/180; the apparatus 1502). The second wireless device 904 may receive an indication of one or more verification bits, decode the one or more verification bits, and transmit a feedback to the first wireless device.

At 1202, the second wireless device may obtain the at least one secret key including the one or more secret key bits for the communication with the first wireless device. In some aspects, at least one secret key may be generated based on channel randomness or obtained from a third wireless device. In one aspect, the two wireless devices may send reference signals to each other and generate the secret key from each end based on certain metrics obtained from the estimated channel carrying the reference signal. In another aspect, the secret key may be configured by a third party. For example, at 907, the second wireless device 904 may obtain the at least one secret key including the one or more secret key bits for the communication with the first wireless device 902. Furthermore, 1202 may be performed by a secret key configuring component 1440 or a secret key configuring component 1540.

At 1204, the second wireless device may select the at least one resource is for communication of the one or more verification bits based on at least one of a source ID of the first wireless device, a destination ID of the second wireless device, or the at least one secret key obtained at 1202. In some aspects, the second wireless device may determine the PRB to receive the verification bits from the first wireless device based at least in part on the verification bits. In one aspect, the two wireless devices may include a base station and a UE in the Uu link, and the base station may configure multiple PRB s, and one of the PRB may be selected partially based on a hashed value of the secret key. In another aspect, the two wireless devices may include a first UE and a second UE in the sidelink, and the second wireless device may determine the PSFCH resources to receive the verification bits from the first wireless device. The second wireless device may select one PSFCH resource from a set of resources assigned for PSFCH to receive the PSFCH based at least in part on the secret key or the verification bits. For example, at 911, the second wireless device 904 may select the at least one resource is for communication of the one or more verification bits based on at least one of a source ID of the first wireless device 902, a destination ID of the second wireless device 904, or the at least one secret key obtained at 907. Furthermore, 1204 may be performed by a physical resource selecting component 1444 or a physical resource selecting component 1544.

At 1206, the second wireless device may receive, from the first wireless device via at least one resource, an indication of one or more verification bits, the one or more verification bits corresponding to at least one secret key, the at least one secret key being associated with communication with the first wireless device. The second wireless device may receive the indication of the one or more verification bits on the at least one resource selected at 1204 for communication of the one or more verification bits. For example, at 912, the second wireless device 904 may receive, from the second wireless device 904 via at least one resource, an indication of one or more verification bits, the one or more verification bits corresponding to at least one secret key, the at least one secret key being associated with communication with the first wireless device 902. Furthermore, 1206 may be performed by a verification bits component 1442 or a verification bits component 1542.

At 1208, the second wireless device may decode the one or more verification bits based on at least one of a bitmap, a hash function, or a polynomial, such that the decoded one or more verification bits correspond to one or more secret key bits of the at least one secret key. In one aspect, the second wireless device may apply the same operation to the secret key obtained at 1202 to generate one or more verification bits and compare the generated one or more verification bits with the one or more verification bits received from the first wireless device at 1206. For example, at 914, the second wireless device 904 may decode the one or more verification bits based on at least one of a bitmap, a hash function, or a polynomial, such that the decoded one or more verification bits correspond to one or more secret key bits of the at least one secret key. Furthermore, 1208 may be performed by the verification bits component 1442 or the verification bits component 1542.

At 1210, the second wireless device may transmit, to the first wireless device, feedback corresponding to the decoded one or more verification bits. In one aspect, the feedback may be an ACK or a NACK, transmitted via at least one of the SCI, the UCI, or the DCI. If the second wireless device determines that there is an agreement of the secret key between the first wireless device and the second wireless device, the second wireless device may transmit an ACK message to the first wireless device. On the UU link, the ACK message may be transmitted on the UCI or the DCI, and on the sidelink link, the ACK message may be transmitted on the SCI. In another aspect, the feedback may include an identifier of the at least one secret key associated with the one or more verification bits. The feedback may include the identifier of the at least one secret key associated with the one or more verification bits. That is, each secret key may be assigned with an ID, i.e., secret-key-ID, and the feedback may include an activation flag of a key_under_use, indicating the secret-key-ID of the secret key that is in an agreement between the first wireless device and the second wireless device. The feedback including the identifier of the at least one secret key may be transmitted via at least one of an RRC message or a MAC-CE. For example, at 916, the second wireless device 904 may transmit, to the first wireless device 902, feedback corresponding to the decoded one or more verification bits. Furthermore, 1210 may be performed by a feedback component 1446 or a feedback component 1546.

At 1212, in response to the feedback transmitted at 1210 being NACK, the second wireless device may re-configure the at least one secret key including the one or more secret key bits based on at least one of the bitmap, the hash function, or the polynomial. In some aspects, the re-configuration of the at least one secret key may include at least one of transmitting one or more reference signal resources for key determination, increasing one or more resource repetitions, using a reference signal with a higher repetition, or increasing a transmission power of the reference signal. For example, at 920, the second wireless device 904 may re-configure the at least one secret key including the one or more secret key bits based on at least one of the bitmap, the hash function, or the polynomial. Furthermore, 1212 may be performed by the secret key configuring component 1440 or the secret key configuring component 1540.

Figure 13:
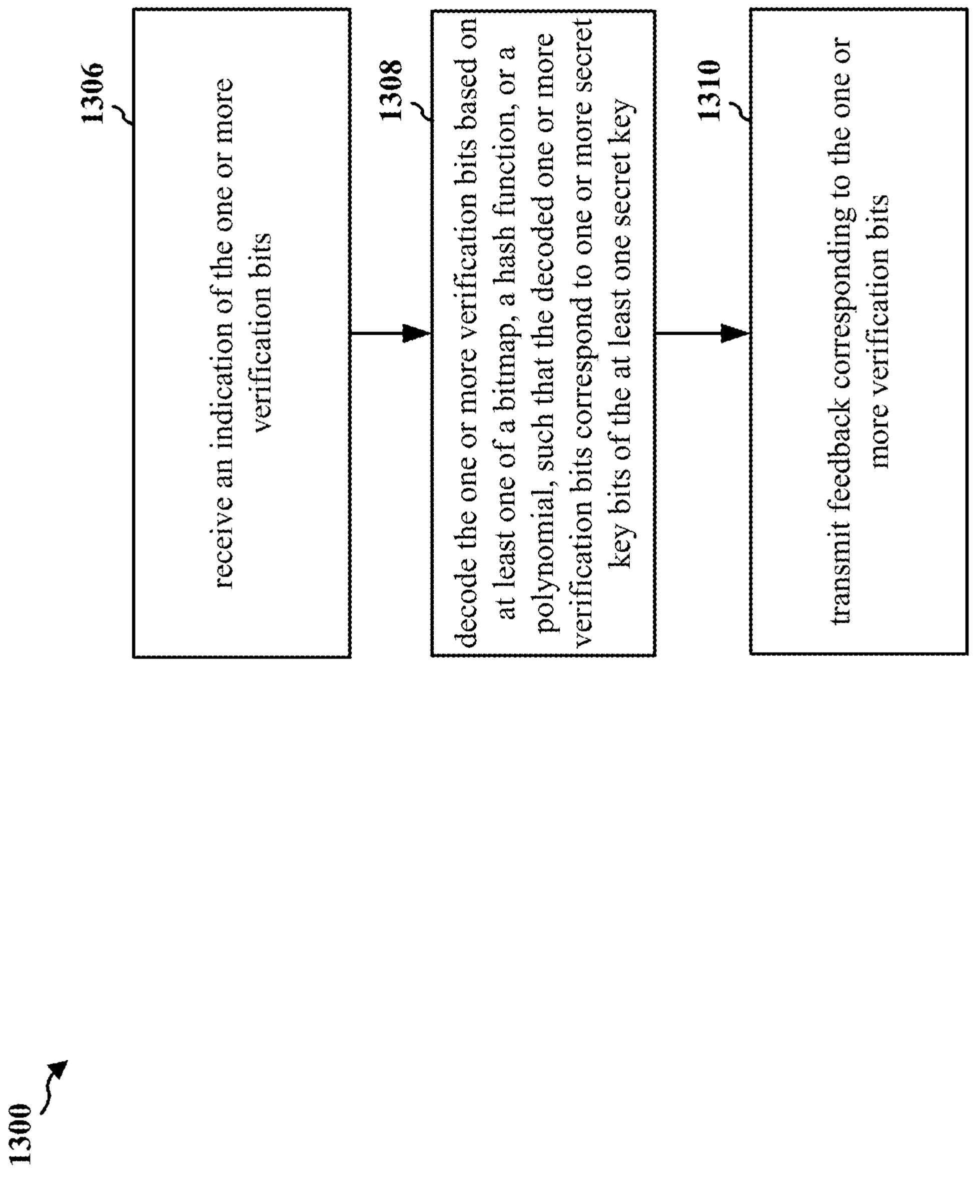
FIG. 13 is a flow chart of a method of wireless communication.

FIG. 13 is a flowchart 1300 of a method of wireless communication. The method may be performed by a second wireless device (e.g., the second wireless device 904), which may include a UE (e.g., the UE 104; the apparatus 1402) or a base station (e.g., the base station 102/180; the apparatus 1502). The second wireless device 904 may receive an indication of one or more verification bits, decode the one or more verification bits, and transmit a feedback to the first wireless device.

At 1306, the second wireless device may receive, from the first wireless device via at least one resource, an indication of one or more verification bits, the one or more verification bits corresponding to at least one secret key, the at least one secret key being associated with communication with the first wireless device. The second wireless device may receive the indication of the one or more verification bits on the at least one resource selected for communication of the one or more verification bits. For example, at 912, the second wireless device 904 may receive, from the second wireless device 904 via at least one resource, an indication of one or more verification bits, the one or more verification bits corresponding to at least one secret key, the at least one secret key being associated with communication with the first wireless device 902. Furthermore, 1306 may be performed by a verification bits component 1442 or a verification bits component 1542.

At 1308, the second wireless device may decode the one or more verification bits based on at least one of a bitmap, a hash function, or a polynomial, such that the decoded one or more verification bits correspond to one or more secret key bits of the at least one secret key. In one aspect, the second wireless device may apply the same operation to the obtained secret key to generate one or more verification bits and compare the generated one or more verification bits with the one or more verification bits received from the first wireless device at 1306. For example, at 914, the second wireless device 904 may decode the one or more verification bits based on at least one of a bitmap, a hash function, or a polynomial, such that the decoded one or more verification bits correspond to one or more secret key bits of the at least one secret key. Furthermore, 1308 may be performed by the verification bits component 1442 or the verification bits component 1542.

At 1310, the second wireless device may transmit, to the first wireless device, feedback corresponding to the decoded one or more verification bits. In one aspect, the feedback may be an ACK or a NACK, transmitted via at least one of the SCI, the UCI, or the DCI. If the second wireless device determines that there is an agreement of the secret key between the first wireless device and the second wireless device, the second wireless device may transmit an ACK message to the first wireless device. On the UU link, the ACK message may be transmitted on the UCI or the DCI, and on the sidelink link, the ACK message may be transmitted on the SCI. In another aspect, the feedback may include an identifier of the at least one secret key associated with the one or more verification bits. The feedback may include the identifier of the at least one secret key associated with the one or more verification bits. That is, each secret key may be assigned with an ID, i.e., secret-key-ID, and the feedback may include an activation flag of a key_under_use, indicating the secret-key-ID of the secret key that is in an agreement between the first wireless device and the second wireless device. The feedback including the identifier of the at least one secret key may be transmitted via at least one of an RRC message or a MAC-CE. For example, at 916, the second wireless device 904 may transmit, to the first wireless device 902, feedback corresponding to the decoded one or more verification bits. Furthermore, 1310 may be performed by a feedback component 1446 or a feedback component 1546.

Figure 14:
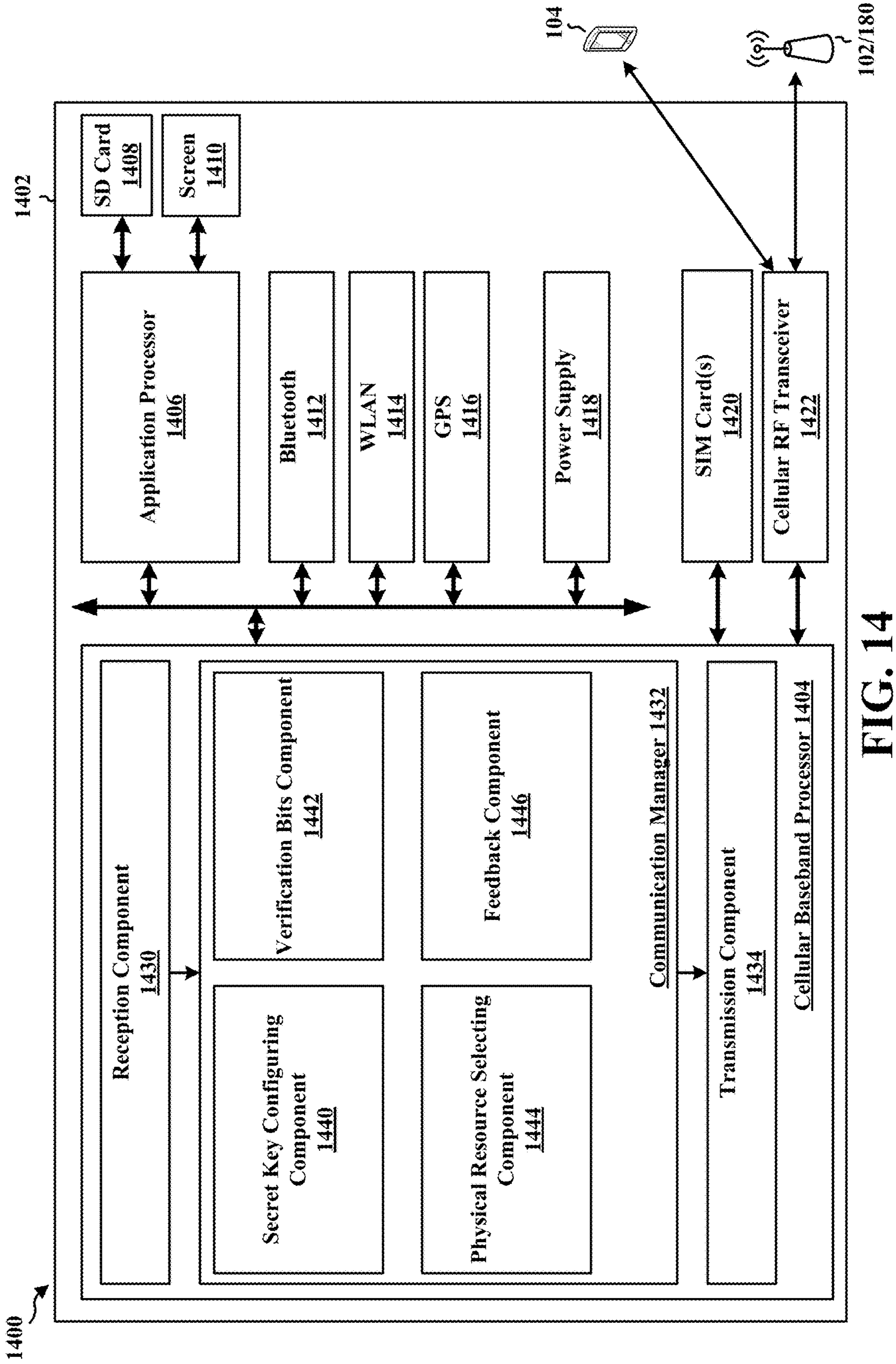
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. The apparatus 1402 may be a first wireless device (e.g., the first wireless device 902) or a second wireless device (e.g., the second wireless device 904). In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 450 and may include the memory 460 and/or at least one of the TX processor 468, the RX processor 456, and the controller/processor 459. In one configuration, the apparatus 1402 may be a modem chip and include just the baseband processor 1404, and in another configuration, the apparatus 1402 may be the entire UE (e.g., see 450 of FIG. 4) and include the additional modules of the apparatus 1402.

The communication manager 1432 includes a secret key configuring component 1440 that is configured to obtain the at least one secret key including the one or more secret key bits for the communication with the second wireless device, or re-configure the at least one secret key including the one or more secret key bits based on at least one of the bitmap, the hash function, or the polynomial, e.g., as described in connection with 1002, 1012, 1202, or 1212. The communication manager 1432 further includes a verification bits component 1442 that is configured to encode or modify at least one secret key including one or more secret key bits based on at least one of a bitmap, a hash function, or a polynomial, such that the one or more secret key bits correspond to one or more verification bits, the at least one secret key associated with communication with a second wireless device, transmit or receive an indication of the one or more verification bits, or decode the one or more verification bits based on at least one of a bitmap, a hash function, or a polynomial, such that the decoded one or more verification bits correspond to one or more secret key bits of the at least one secret key, e.g., as described in connection with 1004, 1008, 1104, 1108, 1206, 1208, 1306, or 1308. The communication manager 1432 further includes a physical resource selecting component 1444 that is configured to select the at least one resource is for communication of the one or more verification bits based on at least one of a source ID of the first wireless device, a destination ID of the second wireless device, or the at least one secret key, e.g., as described in connection with 1006 or 1204. The communication manager 1432 further includes a feedback component 1446 that is configured to transmit or receive feedback corresponding to the one or more verification bits, e.g., as described in connection with 1010, 1110, 1210, or 1310.

The apparatus may include additional components that perform each of the blocks of the algorithm in the flowcharts of FIGS. 9, 10, 11, 12, and 13. As such, each block in the flowcharts of FIGS. 9, 10, 11, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for encoding or modifying at least one secret key including one or more secret key bits based on at least one of a bitmap, a hash function, or a polynomial, such that the one or more secret key bits correspond to one or more verification bits, the at least one secret key being associated with communication with the second wireless device, means for decoding the one or more verification bits based on at least one of a bitmap, a hash function, or a polynomial, such that the decoded one or more verification bits correspond to one or more secret key bits of the at least one secret key, means for transmitting, to the second wireless device, an indication of the one or more verification bits, means for receiving, from the first wireless device via at least one resource, an indication of one or more verification bits, the one or more verification bits corresponding to at least one secret key, the at least one secret key being associated with communication with the first wireless device, means for transmitting, to the first wireless device, feedback corresponding to the decoded one or more verification bits, and means for receiving, from the second wireless device, feedback corresponding to the one or more verification bits. The apparatus 1402 includes means for obtaining the at least one secret key including the one or more secret key bits, and means for selecting at least one resource of a plurality of resources for the communication of the one or more verification bits based on at least one of a source ID of the first wireless device, a destination ID of the second wireless device, or the encoded or modified at least one secret key. The apparatus 1402 includes means for re-configuring the at least one secret key including the one or more secret key bits based on at least one of the bitmap, the hash function, or the polynomial. The means may be one or more of the components of the apparatus 1402 configured to perform the functions recited by the means. As described supra, the apparatus 1402 may include the TX Processor 468, the RX Processor 456, and the controller/processor 459. As such, in one configuration, the means may be the TX Processor 468, the RX Processor 456, and the controller/processor 459 configured to perform the functions recited by the means.

Figure 15:
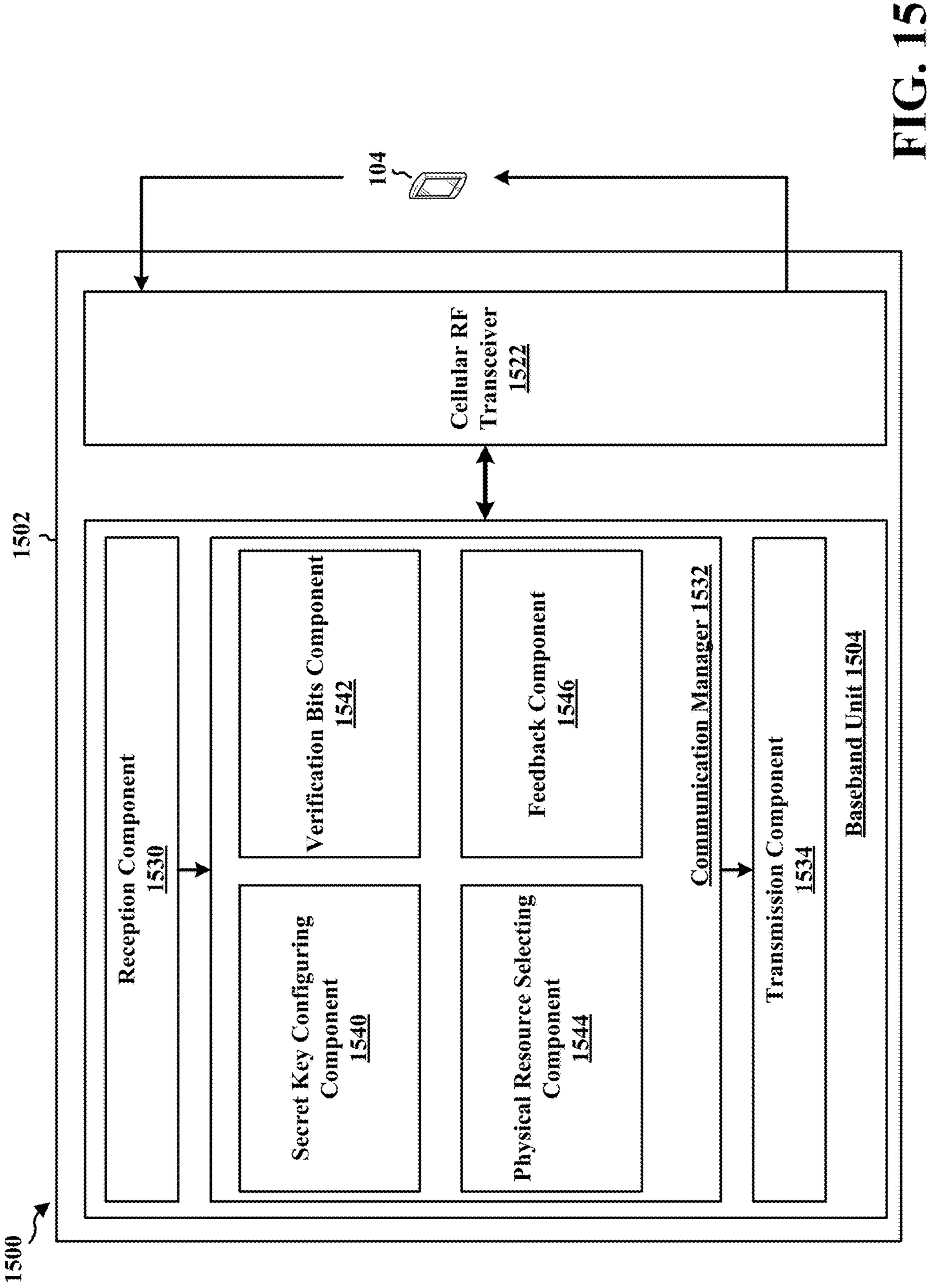
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. The apparatus 1502 may be a first wireless device (e.g., the first wireless device 902) or a second wireless device (e.g., the second wireless device 904). In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 410 and may include the memory 476 and/or at least one of the TX processor 416, the RX processor 470, and the controller/processor 475.

The communication manager 1532 includes a secret key configuring component 1540 that is configured to obtain the at least one secret key including the one or more secret key bits for the communication with the second wireless device, or re-configure the at least one secret key including the one or more secret key bits based on at least one of the bitmap, the hash function, or the polynomial, e.g., as described in connection with 1002, 1012, 1202, or 1212. The communication manager 1532 further includes a verification bits component 1542 that is configured to encode or modify at least one secret key including one or more secret key bits based on at least one of a bitmap, a hash function, or a polynomial, such that the one or more secret key bits correspond to one or more verification bits, the at least one secret key associated with communication with a second wireless device, transmit or receive an indication of the one or more verification bits, or decode the one or more verification bits based on at least one of a bitmap, a hash function, or a polynomial, such that the decoded one or more verification bits correspond to one or more secret key bits of the at least one secret key, e.g., as described in connection with 1004, 1008, 1104, 1108, 1206, 1208, 1306, or 1308. The communication manager 1532 further includes a physical resource selecting component 1544 that is configured to select the at least one resource is for communication of the one or more verification bits based on at least one of a source ID of the first wireless device, a destination ID of the second wireless device, or the at least one secret key, e.g., as described in connection with 1006 or 1204. The communication manager 1532 further includes a feedback component 1546 that is configured to transmit or receive feedback corresponding to the one or more verification bits, e.g., as described in connection with 1010, 1110, 1210, or 1310.

The apparatus may include additional components that perform each of the blocks of the algorithm in the flowcharts of FIGS. 9, 10, 11, 12, and 13. As such, each block in the flowcharts of FIGS. 9, 10, 11, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for encoding or modifying at least one secret key including one or more secret key bits based on at least one of a bitmap, a hash function, or a polynomial, such that the one or more secret key bits correspond to one or more verification bits, the at least one secret key being associated with communication with the second wireless device, means for decoding the one or more verification bits based on at least one of a bitmap, a hash function, or a polynomial, such that the decoded one or more verification bits correspond to one or more secret key bits of the at least one secret key, means for transmitting, to the second wireless device, an indication of the one or more verification bits, means for receiving, from the first wireless device via at least one resource, an indication of one or more verification bits, the one or more verification bits corresponding to at least one secret key, the at least one secret key being associated with communication with the first wireless device, means for transmitting, to the first wireless device, feedback corresponding to the decoded one or more verification bits, and means for receiving, from the second wireless device, feedback corresponding to the one or more verification bits. The apparatus 1502 includes means for obtaining the at least one secret key including the one or more secret key bits, and means for selecting at least one resource of a plurality of resources for the communication of the one or more verification bits based on at least one of a source ID of the first wireless device, a destination ID of the second wireless device, or the encoded or modified at least one secret key. The apparatus 1502 includes means for re-configuring the at least one secret key including the one or more secret key bits based on at least one of the bitmap, the hash function, or the polynomial. The means may be one or more of the components of the apparatus 1502 configured to perform the functions recited by the means. As described supra, the apparatus 1502 may include the TX Processor 416, the RX Processor 470, and the controller/processor 475. As such, in one configuration, the means may be the TX Processor 416, the RX Processor 470, and the controller/processor 475 configured to perform the functions recited by the means.

The apparatus may include first and second wireless devices, and the first and second wireless devices may be a UE or a base station. The first wireless device may generate one or more verification bits based on one or more secret keys, and transmit to the second wireless device the indication of the one or more verification bits. The second wireless device may receive the indication of the one or more verification bits, decode the one or more verification bits, and transmit feedback to the first wireless device. The first and second wireless devices may select at least one resource of a plurality of resources for the communication of the one or more verification bits based on at least part in the encoded or modified at least one secret key to communicate the one or more verification bits.

In one aspect, the first and second wireless devices may obtain the at least one secret key including the one or more secret key bits for the communication with the second wireless device. The at least one secret key may be generated based on channel randomness or obtained from a third wireless device.

In some aspects, the feedback may be an ACK or a NACK, received via at least one of SCI, UCI, or DCI. In one aspect, the feedback may be the NACK, and the first and second wireless devices may re-configure the at least one secret key including the one or more secret key bits based on at least one of the bitmap, the hash function, or the polynomial. In one aspect, the feedback may include an identifier of the at least one secret key associated with the one or more verification bits, and the feedback may be received via at least one of an RRC message or a MAC-CE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to encode or modify at least one secret key including one or more secret key bits based on at least one of a bitmap, a hash function, or a polynomial, such that the one or more secret key bits correspond to one or more verification bits, the at least one secret key being associated with communication with a second wireless device, transmit, to the second wireless device, an indication of the one or more verification bits, and receive, from the second wireless device, feedback corresponding to the one or more verification bits.

Aspect 2 is the apparatus of aspect 1, further including a transceiver coupled to the at least one processor, where the first wireless device is a UE or a base station.

Aspect 3 is the apparatus of any of aspects 1 and 2, where the at least one processor and the memory are further configured to select at least one resource of a plurality of resources for the communication of the one or more verification bits based on at least one of a source ID of the first wireless device, a destination ID of the second wireless device, or the encoded or modified at least one secret key, where the indication of the one or more verification bits is transmitted via the selected at least one resource.

Aspect 4 is the apparatus of any of aspects 1 to 3, where the at least one processor and the memory are further configured to obtain the at least one secret key including the one or more secret key bits for the communication with the second wireless device.

Aspect 5 is the apparatus of aspect 4, where the at least one secret key is generated based on channel randomness or obtained from a third wireless device.

Aspect 6 is the apparatus of any of aspects 1 to 5, where the feedback is an ACK or a NACK, received via at least one of SCI, UCI, or DCI.

Aspect 7 is the apparatus of aspect 6, where the feedback is the NACK, and the at least one processor and the memory are further configured to re-configure the at least one secret key including the one or more secret key bits based on at least one of the bitmap, the hash function, or the polynomial.

Aspect 8 is the apparatus of aspect 7, where to re-configure the at least one secret key, the at least one processor and the memory are configured to at least one of receive one or more reference signal resources for key determination, increase one or more resource repetitions or use a reference signal with a higher repetition, or increase a transmission power of the reference signal.

Aspect 9 is the apparatus of any of aspects 1 to 8, where the feedback includes an identifier of the at least one secret key associated with the one or more verification bits.

Aspect 10 is the apparatus of aspect 9, where the feedback is received via at least one of an RRC message or a MAC-CE.

Aspect 11 is a method of wireless communication for implementing any of aspects 1 to 10.

Aspect 12 is an apparatus for wireless communication including means for implementing any of aspects 1 to 10.

Aspect 13 is a computer-readable medium storing computer executable code, where the code when executed by a processor causes the processor to implement any of aspects 1 to 10.

Aspect 14 is an apparatus for wireless communication including at least one processor coupled to a memory and configured to receive, from a second wireless device via at least one resource, an indication of one or more verification bits, the one or more verification bits corresponding to at least one secret key, the at least one secret key being associated with communication with the first wireless device, decode the one or more verification bits based on at least one of a bitmap, a hash function, or a polynomial, such that the decoded one or more verification bits correspond to one or more secret key bits of the at least one secret key, and transmit, to the first wireless device, feedback corresponding to the decoded one or more verification bits.

Aspect 15 is the apparatus of aspect 14, further including a transceiver coupled to the at least one processor, where the first wireless device is a UE or a base station.

Aspect 16 is the apparatus of any of aspects 14 and 15, where the at least one resource is selected for the communication of the one or more verification bits based on at least one of a source ID of the first wireless device, a destination ID of the second wireless device, or the at least one secret key.

Aspect 17 is the apparatus of any of aspects 14 to 16, where the at least one processor and the memory are further configured to obtain the at least one secret key including the one or more secret key bits for the communication with the second wireless device.

Aspect 18 is the apparatus of aspect 17, where the at least one secret key is generated based on channel randomness or obtained from a third wireless device.

Aspect 19 is the apparatus of any of aspects 14 to 18, where the feedback is an ACK or a NACK, transmitted via at least one of SCI, UCI, or DCI.

Aspect 20 is the apparatus of aspect 19, where the feedback is the NACK, and the at least one processor and the memory are further configured to re-configure the at least one secret key including the one or more secret key bits based on at least one of the bitmap, the hash function, or the polynomial.

Aspect 21 is the apparatus of aspect 20, where to re-configure the at least one secret key, the at least one processor and the memory are configured to at least one of transmit one or more reference signal resources for key determination, increase one or more resource repetitions or use a reference signal with a higher repetition, or increase a transmission power of the reference signal.

Aspect 22 is the apparatus of any of aspects 14 to 21, where the feedback includes an identifier of the at least one secret key associated with the one or more verification bits.

Aspect 23 is the apparatus of aspect 22, where the feedback is transmitted via at least one of an RRC message or a MAC-CE.

Aspect 24 is a method of wireless communication for implementing any of aspects 14 to 23.

Aspect 25 is an apparatus for wireless communication including means for implementing any of aspects 14 to 23.

Aspect 26 is a computer-readable medium storing computer executable code, where the code when executed by a processor causes the processor to implement any of aspects 14 to 23.

What is claimed is:

1. An apparatus for wireless communication at a first wireless device, comprising:
- memory; and
- at least one processor coupled to the memory, the at least one processor and the memory configured to:
  - encode or modify at least one secret key including one or more secret key bits based on at least one of a bitmap, a hash function, or a polynomial, such that the encoded or modified one or more secret key bits correspond to one or more verification bits, the at least one secret key being associated with communication with a second wireless device;
  - transmit, to the second wireless device, an indication of the one or more verification bits via at least one resource selected based on the at least one secret key for the indication; and
  - receive, from the second wireless device, feedback corresponding to the one or more verification bits and the at least one resource selected based on the at least one secret key for the indication.

2. The apparatus of claim 1, further comprising a transceiver coupled to the at least one processor, wherein the first wireless device is a UE or a base station, wherein the at least one processor and the memory are configured to:
- transmit, via the transceiver, the indication of the one or more verification bits; and
- receive, via the transceiver, the feedback corresponding to the one or more verification bits and the at least one resource selected based on the at least one secret key for the indication.

3. The apparatus of claim 1, wherein the at least one processor and the memory are further configured to;
- select the at least one resource from a plurality of resources for the communication of the one or more verification bits based on: a source identifier (ID) of the first wireless device or a destination ID of the second wireless device, and the encoded or modified at least one secret key.

4. The apparatus of claim 1, wherein the at least one processor and the memory are further configured to:
- obtain the at least one secret key including the one or more secret key bits for the communication with the second wireless device.

5. The apparatus of claim 4, wherein, to obtain the at least one secret key, the at least one processor and the memory are configured to:
- generate the at least one secret key based on channel randomness; or
- receive the at least one secret key from a third wireless device.

6. The apparatus of claim 1, wherein, to receive the feedback corresponding to the one or more verification bits and the at least one resource selected based on the at least one secret key for the indication, the at least one processor and the memory are configured to:
- receive at least one of sidelink control information (SCI), uplink control information (UCI), or downlink control information (DCI) comprising an acknowledgement (ACK) or a negative ACK (NACK).

7. The apparatus of claim 6, wherein the feedback is the NACK, and the at least one processor and the memory are further configured to:
- re-configure, in response to the received feedback comprising the NACK, the at least one secret key including the one or more secret key bits based on at least one of the bitmap, the hash function, or the polynomial.

8. The apparatus of claim 7, wherein to re-configure the at least one secret key, the at least one processor and the memory are configured to at least one of:
- receive one or more reference signal resources for key determination;
- increase one or more resource repetitions;
- use a reference signal with a higher repetition; or
- increase a transmission power of the reference signal.

9. The apparatus of claim 1, wherein the feedback includes at least one secret key identifier (ID), wherein the at least one processor and the memory are configured to:
- activate a second at least one secret key based on the at least one secret key ID of the feedback.

10. The apparatus of claim 9, wherein to receive the feedback, the at least one processor and the memory are configured to:
- receive at least one of a radio resource control (RRC) message or a medium access control (MAC) control element (CE) (MAC-CE) comprising the feedback.

11. The apparatus of claim 1, wherein, to encode or modify the at least one secret key, the at least one processor and the memory are configured to:
- encode or modify the at least one secret key based on the hash function and at least one of the bitmap or the polynomial, such that the encoded or modified one or more secret key bits correspond to one or more verification bits.

12. A method of wireless communication at a first wireless device, comprising:

encoding or modifying at least one secret key including one or more secret key bits based on at least one of a bitmap, a hash function, or a polynomial, such that the encoded or modified one or more secret key bits correspond to one or more verification bits, the at least one secret key being associated with communication with a second wireless device;

transmitting, to the second wireless device, an indication of the one or more verification bits via at least one resource selected based on the at least one secret key for the indication; and receiving, from the second wireless device, feedback corresponding to the one or more verification bits and the at least one resource selected based on the at least one secret key for the indication.

13. The method of claim 12, further comprising:

obtaining the at least one secret key including the one or more secret key bits for the communication with the first wireless device.

14. The method of claim 12, wherein receiving the feedback corresponding to the one or more verification bits comprises:

receiving is a negative acknowledgement (NACK), wherein the method further comprises:

re-configuring, in response to the received feedback comprising the NACK, the at least one secret key including the one or more secret key bits based on at least one of the bitmap, the hash function, or the polynomial.

15. The method of claim 14, wherein re-configuring the at least one secret key comprises at least one of:

receiving one or more reference signal resources for key determination;

increasing one or more resource repetitions;

using a reference signal with a higher repetition; or increasing a transmission power of the reference signal.

16. The method of claim 12, wherein the feedback includes at least one secret key identifier (ID), wherein the method further comprises:

activating a second at least one secret key based on the at least one secret key ID of the feedback.

17. An apparatus for wireless communication at a first wireless device, comprising:

memory; and at least one processor coupled to the memory, the at least one processor and the memory configured to:

receive, from a second wireless device via at least one selected resource, an indication of one or more verification bits, the one or more verification bits corresponding to at least one secret key, the at least one selected resource corresponding to the at least one secret key, the at least one secret key being associated with communication with the first wireless device;

decode the one or more verification bits based on at least one of a bitmap, a hash function, or a polynomial, such that the decoded one or more verification bits correspond to one or more secret key bits of the at least one secret key; and transmit, to the first wireless device, feedback corresponding to the decoded one or more verification bits and the at least one selected resource corresponding to the at least one secret key.

18. The apparatus of claim 17, further comprising a transceiver coupled to the at least one processor, wherein the first wireless device is a UE or a base station, wherein the at least one processor and the memory are configured to:

receive, via the transceiver, the indication of the one or more verification bits; and transmit, via the transceiver, the feedback corresponding to the one or more verification bits and the at least one resource selected based on the at least one secret key for the indication.

19. The apparatus of claim 17, wherein the at least one processor and the memory are further configured to:

select the at least one selected resource from a plurality of resources for the communication of the one or more verification bits based on: a source identifier (ID) of the first wireless device or a destination ID of the second wireless device, and the at least one secret key.

20. The apparatus of claim 17, wherein the at least one processor and the memory are further configured to:

obtain the at least one secret key including the one or more secret key bits for the communication with the second wireless device.

21. The apparatus of claim 20, wherein, to obtain the at least one secret key, the at least one processor and the memory are configured to:

generate the at least one secret key based on channel randomness; or receive the at least one secret key from a third wireless device.

22. The apparatus of claim 17, wherein, to transmit the feedback corresponding to the decoded one or more verification bits and the at least one selected resource corresponding to the at least one secret key, the at least one processor and the memory are configured to:

transmit at least one of sidelink control information (SCI), uplink control information (UCI), or downlink control information (DCI) comprising an acknowledgement (ACK) or a negative ACK (NACK).

23. The apparatus of claim 22, wherein the feedback comprises the NACK, and the at least one processor and the memory are further configured to;

re-configure, based on the NACK, the at least one secret key including the one or more secret key bits based on at least one of the bitmap, the hash function, or the polynomial.

24. The apparatus of claim 23, wherein to re-configure the at least one secret key, the at least one processor and the memory are configured to at least one of:

transmit one or more reference signal resources for key determination;

increase one or more resource repetitions;

use a reference signal with a higher repetition; or increase a transmission power of the reference signal.

25. The apparatus of claim 17, wherein the feedback includes at least one secret key identifier (ID).

26. The apparatus of claim 25, wherein to transmit the feedback, the at least one processor and the memory are configured to;

transmit at least one of a radio resource control (RRC) message or a medium access control (MAC) control element (CE) (MAC-CE) comprising the feedback.

27. A method of wireless communication at a first wireless device, comprising:

receiving, from a second wireless device via at least one selected resource, an indication of one or more verification bits, the one or more verification bits corresponding to at least one secret key, the at least one selected resource corresponding to the at least one secret key, the at least one secret key being associated with communication with the first wireless device;

decoding the one or more verification bits based on at least one of a bitmap, a hash function, or a polynomial, such that the decoded one or more verification bits correspond to one or more secret key bits of the at least one secret key; and transmitting, to the first wireless device, feedback corresponding to the decoded one or more verification bits and the at least one selected resource corresponding to the at least one secret key.

28. The method of claim 27, further comprising:

obtaining the at least one secret key including the one or more secret key bits for the communication with the first wireless device.

29. The method of claim 27, wherein the feedback comprises a negative acknowledgement (NACK), and the method further comprises:

re-configuring, based on the NACK, the at least one secret key including the one or more secret key bits based on at least one of the bitmap, the hash function, or the polynomial.

30. The method of claim 29, wherein re-configuring the at least one secret key comprises at least one of:

transmitting one or more reference signal resources for key determination;

increasing one or more resource repetitions; using a reference signal with a higher repetition; or increasing a transmission power of the reference signal.

* * * * *